(12) United States Patent
Kitani

(10) Patent No.: US 9,832,391 B2
(45) Date of Patent: Nov. 28, 2017

(54) IMAGE CAPTURING APPARATUS AND METHOD FOR CONTROLLING IMAGE CAPTURING APPARATUS

(71) Applicant: CANON KABUSHIKI KAISHA, Tokyo (JP)

(72) Inventor: Kazunari Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 14/692,083

(22) Filed: Apr. 21, 2015

(65) Prior Publication Data

US 2015/0312485 A1    Oct. 29, 2015

(30) Foreign Application Priority Data

Apr. 25, 2014  (JP) ................................ 2014-092002

(51) Int. Cl.
  *H04N 5/232*  (2006.01)
  *H04N 5/243*  (2006.01)
  (Continued)

(52) U.S. Cl.
  CPC ......... *H04N 5/243* (2013.01); *H04N 5/23212* (2013.01); *H04N 5/23245* (2013.01);
  (Continued)

(58) Field of Classification Search
  CPC ................................................ H04N 5/35563
  See application file for complete search history.

(56) References Cited

U.S. PATENT DOCUMENTS 6,831,692 B1 * 12/2004 Oda .................. H01L 27/14621
                                                        250/208.1
6,933,978 B1    8/2005 Suda
                        (Continued)

FOREIGN PATENT DOCUMENTS

CN    102932590 A    2/2013
CN    103002217 A    3/2013
                (Continued)

OTHER PUBLICATIONS

Sep. 24, 2015 European Search Report, that issued in the corresponding European Patent Application No. 15163115.7.
(Continued)

*Primary Examiner* — Anthony J Daniels
(74) *Attorney, Agent, or Firm* — Cowan, Liebowitz & Latman, P.C.

(57) ABSTRACT

An image capturing apparatus comprises: an image sensor including a pixel region including a plurality of pixel units, arranged in a matrix, each having first and second photoelectric conversion units, and a storage unit provided for each column; and a driving unit configured to drive the image sensor by, for each pixel unit to be read of the plurality of pixel units, exclusively selecting an operation of combining a signal of the first photoelectric conversion unit and a signal of the second photoelectric conversion unit for each pixel unit and outputting the combined signal to the storage unit, an operation of reading a signal from the first photoelectric conversion unit of each pixel unit to the storage unit, or an operation of reading a signal from the second photoelectric conversion unit of each pixel unit to the storage unit.

11 Claims, 13 Drawing Sheets

(51) Int. Cl.
*H04N 5/345* (2011.01)
*H04N 5/347* (2011.01)
*H04N 5/3745* (2011.01)
*H04N 5/374* (2011.01)
*H04N 5/369* (2011.01)
*H04N 5/378* (2011.01)

(52) U.S. Cl.
CPC ............ *H04N 5/347* (2013.01); *H04N 5/3456* (2013.01); *H04N 5/374* (2013.01); *H04N 5/37457* (2013.01); *H04N 5/3696* (2013.01); *H04N 5/378* (2013.01)

(56) References Cited

U.S. PATENT DOCUMENTS

| | | | | |
|---|---|---|---|---|
| 7,440,690 | B2 * | 10/2008 | Ide | G03B 13/32 348/345 |
| 9,029,749 | B2 * | 5/2015 | Unagami | H01L 27/148 250/208.1 |
| 2001/0036361 | A1 | 11/2001 | Suda | |
| 2008/0180549 | A1 * | 7/2008 | Lee | G03B 19/26 348/231.2 |
| 2010/0328479 | A1 * | 12/2010 | Sambongi | H04N 5/35563 348/222.1 |
| 2014/0307141 | A1 * | 10/2014 | Tanaka | H04N 9/07 348/281 |
| 2014/0368680 | A1 * | 12/2014 | Ayers | H01L 27/14609 348/216.1 |

FOREIGN PATENT DOCUMENTS

| | | |
|---|---|---|
| CN | 103168463 A | 6/2013 |
| JP | 2001-124984 A | 5/2001 |
| JP | 2010-219958 A | 9/2010 |
| JP | 2013-106194 A | 5/2013 |

OTHER PUBLICATIONS

Jan. 10, 2017 Korean Office Action, without an English Translation, that issued in Korean Patent Application No. 10-2015-0057667.
Sep. 30, 2017 Chinese Office Action that issued in Chinese Patent Application No. 201510201028.6.

* cited by examiner

☐ COMBINED SIGNAL     ⋯ A-PIXEL SIGNAL     ▨ B-PIXEL SIGNAL

IMAGE CAPTURING APPARATUS AND METHOD FOR CONTROLLING IMAGE CAPTURING APPARATUS

BACKGROUND OF THE INVENTION

Field of the Invention

The present invention relates to image capturing apparatuses and methods for controlling image capturing apparatuses.

Description of the Related Art

In the related art, the contrast detection scheme is known in automatic focus detection and automatic focus control of an image capturing apparatus as a typical technique of using a flux of light passing through an imaging lens. In this scheme, an image sensor is used as a sensor for focus detection, an output signal of the image sensor is evaluated, and the position of the imaging lens is moved so that the contrast information is maximized, whereby the focus can be adjusted.

However, the contrast information needs to be evaluated each time the imaging lens is moved to a different position. In addition, after the highest contrast has eventually been found as a result of the evaluation, the imaging lens is moved back to the position where the highest contrast is obtained. Therefore, it takes a long time to complete the process. Therefore, it is difficult to perform a high-speed operation.

In order to address such a drawback, a technique has been proposed according to which a phase difference detection function is incorporated into an image sensor, which can therefore also be used as a focus detection element to directly obtain the amount of defocus of an imaging lens.

For example, according to Japanese Patent Laid-Open No. 2010-219958, a pupil division function is provided to a portion of light receiving elements of an image sensor by decentering the sensitive region of the light receiving portion with respect to the optical axis of an on-chip microlens. By arranging these pixels in the image sensor at predetermined intervals, a phase difference detection function is achieved.

For example, according to Japanese Patent Laid-Open No. 2013-106194, a plurality of photoelectric conversion elements, i.e., an A-pixel and a B-pixel, are provided in a pixel corresponding to each microlens of an image sensor, and an A-pixel output and an (A+B)-pixel output are read out. By performing a subtraction process on these two outputs, a B-pixel output is obtained, whereby a phase difference detection function is achieved.

Japanese Patent Laid-Open No. 2010-219958 above discloses, as an example, a proposal that, in so-called rolling shutter drive, reset lines are scanned in normal pixel rows and in rows including phase difference detection pixels, separately. In this case, in the rows including phase difference detection pixels, a phase difference detection pixel and a normal pixel provided in the same row are read out using the same signal reading method in an image sensor.

The phase difference detection pixel cannot be used as an image signal. Therefore, when a normal image is obtained, the phase difference detection pixel is typically dealt with as a defective pixel, and it is necessary to perform an interpolation process using surrounding pixels. Therefore, it is difficult to excessively increase the proportion of phase difference detection pixels arranged. Therefore, although the same reading circuit configuration as that which is used when no phase difference detection pixel is included can be used, the resolution for phase difference detection is low.

On the other hand, in the related-art technique of Japanese Patent Laid-Open No. 2013-106194 above, all pixels include a plurality of photoelectric conversion elements, and therefore, can each be used as a phase difference detection element, whereby the resolution in the horizontal direction is also improved. However, in order to read an (A+B)-signal and an A-signal from the plurality of photoelectric conversion elements of all pixels, the image sensor requires a reading circuit for reading an (A+B)-pixel and a reading circuit for reading an A-pixel. In particular, a double number of storage capacitors, which occupy a relatively large area in an image sensor, are required, and control lines are complicated, and therefore, the area of a circuit around the image sensor is likely to increase.

As indicated by Japanese Patent Laid-Open No. 2013-106194 above, if all image pixels of the image sensor include a plurality of photoelectric conversion elements, the peripheral read circuit has a complicated circuit configuration, and particularly, a circuit element which has a relatively large area, such as a storage capacitor, is required.

Moreover, an arrangement for subtracting the A-signal from the (A+B)-signal to obtain the B-signal is required in the entire system, disadvantageously leading to large circuit size and high cost. Also, the arrangement for reading out the (A+B)-signal and the A-signal (or the B-signal) is simply equivalent to the two times the number of pixels, and therefore, the reading time is two times as long. Thus, the time it takes to write the column circuit increases, and the horizontal transfer time is simply two times as long, and therefore, it is difficult to perform high-speed reading.

Note that if both the (A+B)-signal and the A-signal are read only from particular rows instead of reading both the (A+B)-signal and the A-signal from all pixels, a longer horizontal transfer time is required only for the particular rows. However, when the cycle of horizontal synchronization is changed only for the particular rows, there is a significantly large load on the system.

SUMMARY OF THE INVENTION

The present invention has been made in consideration of the above situation, and required pixel signals are read out with accuracy sufficient for phase difference detection without an increase in the circuit scale, cost, and read time of an image sensor, and without a decrease in image quality.

According to the present invention, provided is an image capturing apparatus comprising: an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column; and a driving unit configured to drive the image sensor by, for each pixel unit to be read of the plurality of pixel units, exclusively selecting an operation of combining a signal of the first photoelectric conversion unit and a signal of the second photoelectric conversion unit for each pixel unit and outputting the combined signal to the storage unit, an operation of reading a signal from the first photoelectric conversion unit of each pixel unit to the storage unit, or an operation of reading a signal from the second photoelectric conversion unit of each pixel unit to the storage unit.

Further, according to the present invention, provided is an image capturing apparatus comprising: an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column; and a driving unit configured to drive the image sensor by, for each row to be read of the plurality of pixel units, exclusively selecting an operation of combining a signal of the first photoelectric conversion unit and a signal of the second photoelectric conversion unit for each pixel unit and outputting the combined signal to the storage unit, an operation of reading a signal from the first photoelectric conversion unit of each pixel unit to the storage unit, or an operation of reading a signal from the second photoelectric conversion unit of each pixel unit to the storage unit.

Furthermore, according to the present invention, provided is an image capturing apparatus comprising: an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column; and a driving unit configured to drive the image sensor by using a first drive method of, for rows to be read of the plurality of pixel units, combining a signal of the first photoelectric conversion unit and a signal of the second photoelectric conversion unit for each pixel unit and outputting the combined signal to the storage unit while skipping a plurality of rows between the rows to be read, and a second drive method of reading a signal from the first photoelectric conversion unit of each pixel unit to the storage unit in any of the plurality of rows skipped in the first drive method and reading a signal from the second photoelectric conversion unit of each pixel unit to the storage unit in another of the plurality of rows skipped in the first drive method.

Further, according to the present invention, provided is a method for controlling an image capturing apparatus including an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column, the method comprising: driving the image sensor by, for each pixel unit to be read of the plurality of pixel units, exclusively selecting an operation of combining a signal of the first photoelectric conversion unit and a signal of the second photoelectric conversion unit for each pixel unit and outputting the combined signal to the storage unit, an operation of reading a signal from the first photoelectric conversion unit of each pixel unit to the storage unit, or an operation of reading a signal from the second photoelectric conversion unit of each pixel unit to the storage unit.

Further, according to the present invention, provided is a method for controlling an image capturing apparatus including an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column, the method comprising: driving the image sensor by, for each row to be read of the plurality of pixel units, exclusively selecting an operation of combining a signal of the first photoelectric conversion unit and a signal of the second photoelectric conversion unit for each pixel unit and outputting the combined signal to the storage unit, an operation of reading a signal from the first photoelectric conversion unit of each pixel unit to the storage unit, or an operation of reading a signal from the second photoelectric conversion unit of each pixel unit to the storage unit.

Further, according to the present invention, provided is a method for controlling an image capturing apparatus including an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column, the method comprising: driving the image sensor by using a first drive method of, for rows to be read of the plurality of pixel units, combining a signal of the first photoelectric conversion unit and a signal of the second photoelectric conversion unit for each pixel unit and outputting the combined signal to the storage unit while skipping a plurality of rows between the rows to be read, and a second drive method of reading a signal from the first photoelectric conversion unit of each pixel unit to the storage unit in any of the plurality of rows skipped in the first drive method and reading a signal from the second photoelectric conversion unit of each pixel unit to the storage unit in another of the plurality of rows skipped in the first drive method.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
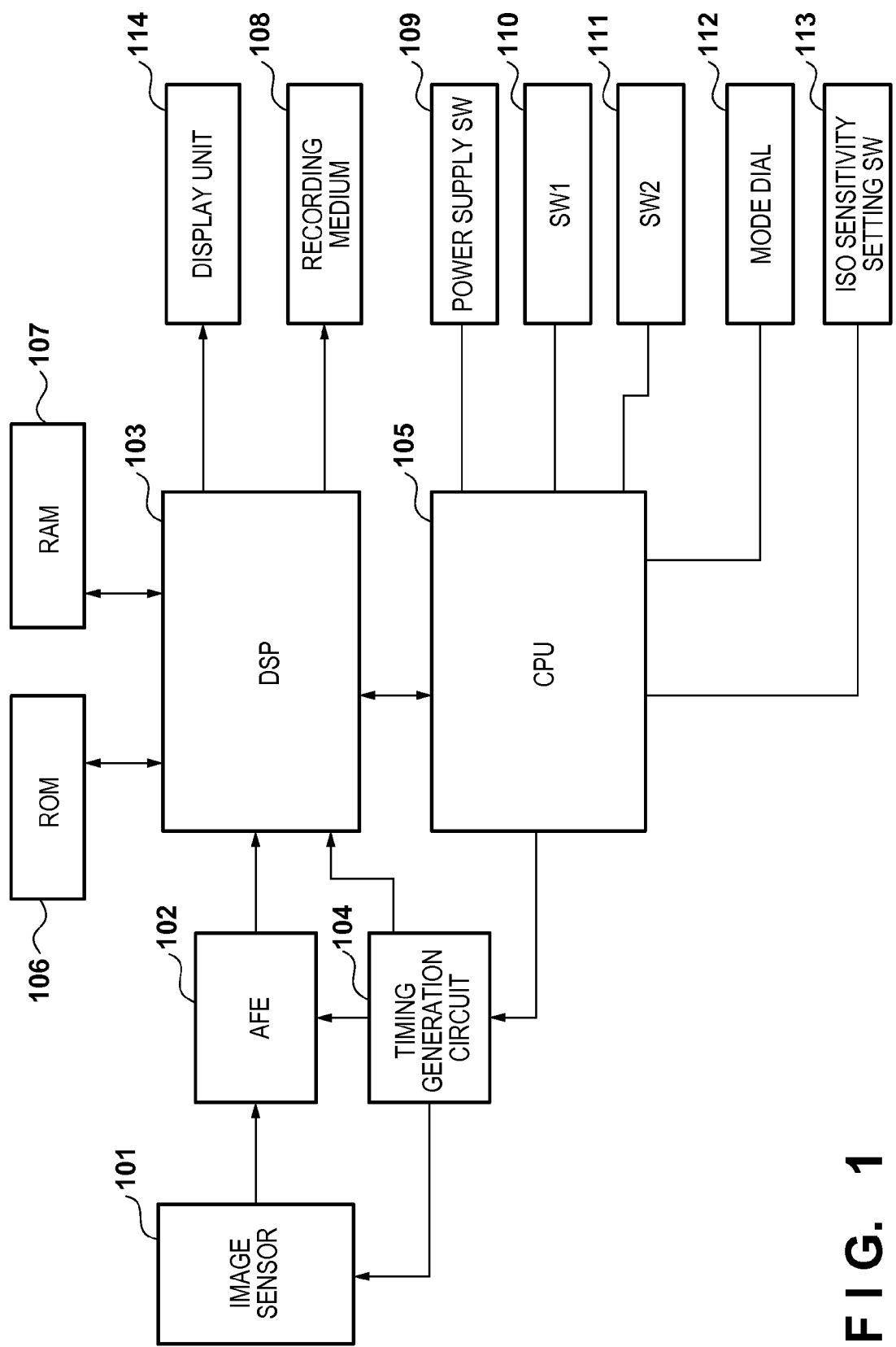
FIG. 1 is a block diagram showing a configuration of an image capturing apparatus according to an embodiment of the present invention.

FIG. 1 is a block diagram of an image capturing apparatus according to a first embodiment of the present invention. An image sensor 101 includes an amplifier circuit (not shown) which switches between gains, depending on ISO sensitivity. An analog front end (AFE) 102 includes an A/D converter which converts an analog signal from the image sensor 101 into a digital signal, and also has a function of clamping a dark offset level.

A digital signal processor (DSP) 103 performs various correction processes, a development process, and a compression process on an image signal output from the AFE 102. The DSP 103 may also perform various correction processes on image signal in a RAM 107. The DSP 103 also performs a correction process on various types of noise occurring in the image sensor 101, defective pixel detection, and a correction process on outputs of a defective pixel and phase difference detection pixels, a correction process on pixels around the phase difference detection pixels, and so forth. The DSP 103 also performs a calculation process of calculating automatic focus information using outputs from the phase difference detection pixels. Note that these processes will be described in detail below.

The DSP 103 also performs an access process on various memories, such as a ROM 106, the RAM 107, and the like, a process of writing image data to a recording medium 108, a process of displaying various data on a display unit 114, and the like. Although, in the first embodiment, a combination of the analog output type CMOS image sensor 101 and the AFE102 is described as an example, a digital output type CMOS image sensor may be used and directly connected to the DSP 103.

A timing generation circuit 104 supplies a clock signal or a control signal to the image sensor 101, the AFE 102, and the DSP 103, and generates timing signals corresponding to various read modes of the image sensor 101 in cooperation with the DSP 103, under the control of a CPU 105.

The CPU 105 controls the DSP 103 and the timing generation circuit 104, and controls camera functions, such as photometry, focus adjustment, and the like. In focus adjustment, AF may be performed using an output of an image sensor (not shown) for phase difference AF, that is provided separately from the image sensor 101, or AF may be performed using automatic focus information which is calculated using outputs of phase difference detection pixels included in the image sensor 101.

Various switches, such as a power supply switch 109, a first-stage shutter switch SW1 (110), a second-stage shutter switch SW2 (111), a mode dial 112, an ISO sensitivity setting switch 113, and the like, are connected to the CPU 105. The CPU 105 performs a process corresponding to the settings of these switches and dials.

The ROM 106 stores a control program for the image capturing apparatus, i.e., a program executed by the CPU 105, and various correction data and the like. The ROM 106 typically includes a flash memory. The RAM 107 is configured so that it can be accessed at a higher rate than that of the ROM 106. The RAM 107 is used as a work area, and temporarily stores image data or the like processed by the DSP 103. The recording medium 108, which is, for example, a memory card or the like for storing captured image data, is connected to the DSP 103 through, for example, a connector (not shown). The display unit 114, which includes an LCD or the like, is used to display information of the image capturing apparatus, display a reproduced captured image, or display a moving image.

The power supply switch 109 is operated by a user in order to activate the image capturing apparatus. When the first-stage shutter switch SW1 (110) is turned on by operating a release button (not shown), pre-shooting processes, such as a photometric process, focus adjustment process, and the like, are performed. Moreover, when the second-stage shutter switch SW2 (111) is turned on, a series of shooting operations including driving a mirror and a shutter (not shown) and writing image data captured by the image sensor 101 to the recording medium 108 through the AFE 102 and the DSP 103, are started. The mode dial 112 is used to set the image capturing apparatus to various operation modes. The ISO sensitivity setting switch 113 is used to set the ISO sensitivity of the image capturing apparatus.

Figure 2A:
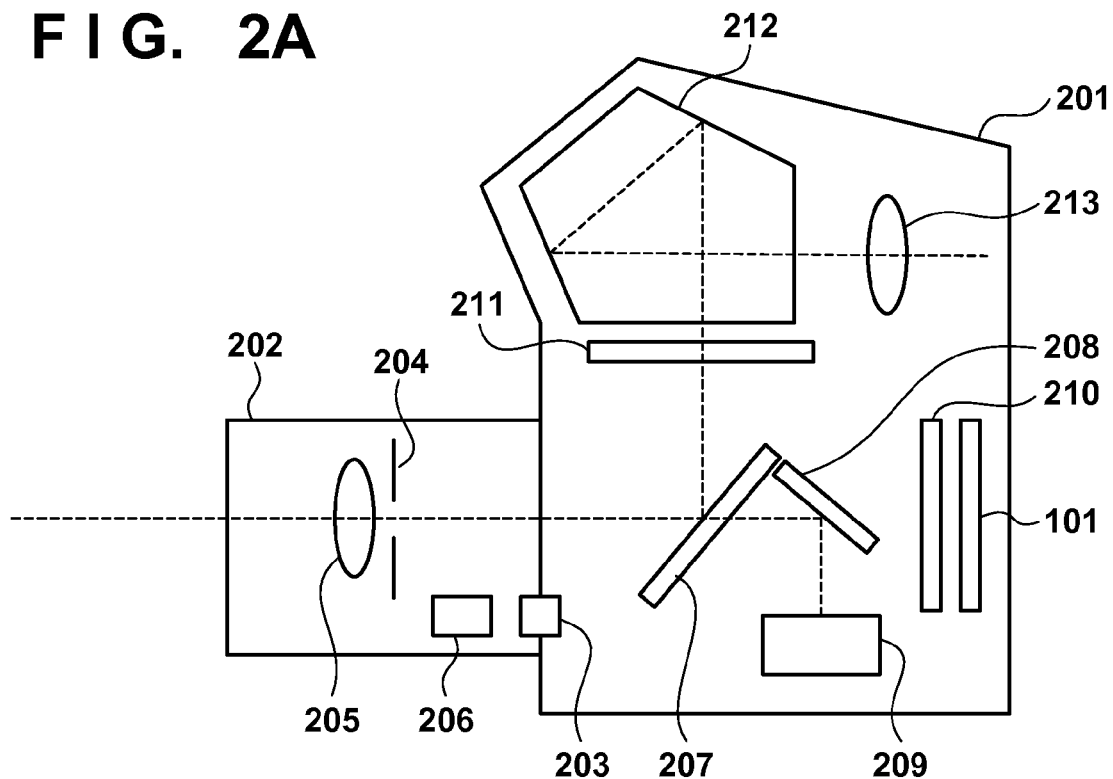
FIGS. 2A and 2B are cross-sectional side views schematically showing the image capturing apparatus according to the embodiment.
Figure 2B:
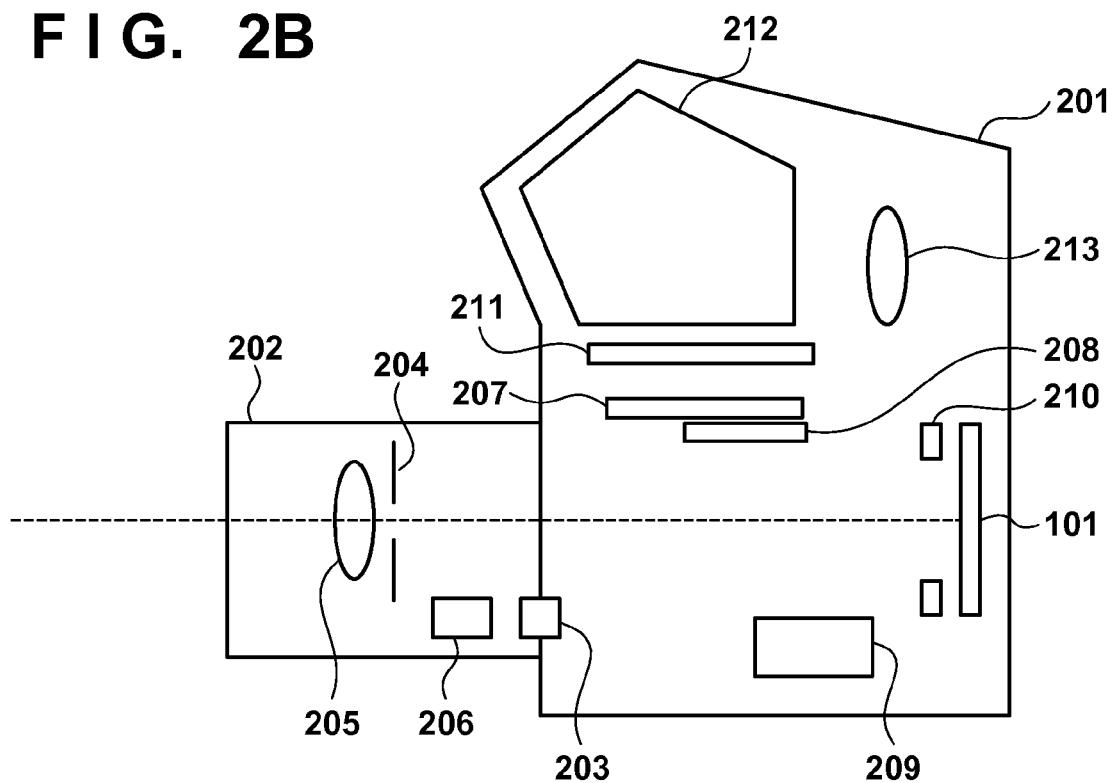

FIGS. 2A and 2B are cross-sectional side views schematically showing a configuration of the image capturing apparatus of FIG. 1. The image capturing apparatus has a state in which an optical viewfinder is used during still image shooting, and a state in which the mirror is at the upper position and the shutter is open during moving image shooting or use of live view. FIG. 2A shows the state in which the optical viewfinder is used. FIG. 2B shows the state in which the mirror is at the upper position and the shutter is open during moving image shooting or live view.

As shown in FIGS. 2A and 2B, the image capturing apparatus of the first embodiment mainly includes a camera body 201, and an imaging lens 202 attached to a front surface of the camera body 201. The imaging lens 202, which is exchangeable, is electrically connected to the camera body 201 through a mount contact point group 203.

The imaging lens 202 includes a diaphragm 204, a focus adjustment lens group 205, and the like, all of which are controlled by a lens control unit 206.

The camera body 201 has a main mirror 207 which is a half mirror. When the optical viewfinder is used as shown in FIG. 2A, the main mirror 207 is provided in the shooting optical path, in a diagonal position, to reflect light from the imaging lens 202 toward a finder optical system. The reflected light is projected to a focusing screen 211, so that a photographer can check an image of a subject projected on the focusing screen 211, through a pentaprism 212 for changing the optical path and an eyepiece lens group 213.

On the other hand, a portion of light passing via the main mirror 207 enters an AF unit 209 through a sub-mirror 208. The AF unit 209 is an AF sensor using the phase difference detection scheme. Although phase difference AF will not be described in detail, an AF operation is performed by controlling the focus adjustment lens group 205 of the imaging lens 202 based on the detection result.

A shooting preparation operation for AE, AF, or the like is performed in response to the SW1 (110), which is operated by a release button (not shown), being turned on when the release button is pressed halfway down. As shown in FIG. 2B, when the SW2 (111) which is turned on when the release button is pressed all the way down, is turned on, the main mirror 207 and the sub-mirror 208 move out of the optical path, and thereafter, a focal plane shutter 210 is open for a predetermined period of time, so that the image sensor 101 is exposed to light. Note that, as shown in FIG. 2A, the focal plane shutter 210 is normally closed, and is open only during shooting so that exposure is performed for a specified period of time.

As shown in FIG. 2B, when the mode is switched using the mode dial 112 so that the image capturing apparatus is in, for example, a live view state, the main mirror 207 and the sub-mirror 208 move out of the optical path, and this state is maintained, as in the still image shooting, which is performed when the SW2 is on. Moreover, the focal plane shutter 210 is also maintained open, and the image sensor 101 is always exposed to light. In this state, a signal obtained from the image sensor 101 is displayed on the display unit 114, thereby a live view mode is achieved. In addition, if a moving image is recorded in this state, a moving image mode can be achieved.

In this case, the sub-mirror 208 is also out of the optical path, and a subject image does not enter the AF unit 209, and therefore, phase difference AF using the AF unit 209 cannot be performed. The main mirror 207 is also out of the optical path, and therefore, a subject image cannot be checked using the optical viewfinder.

Figure 3:
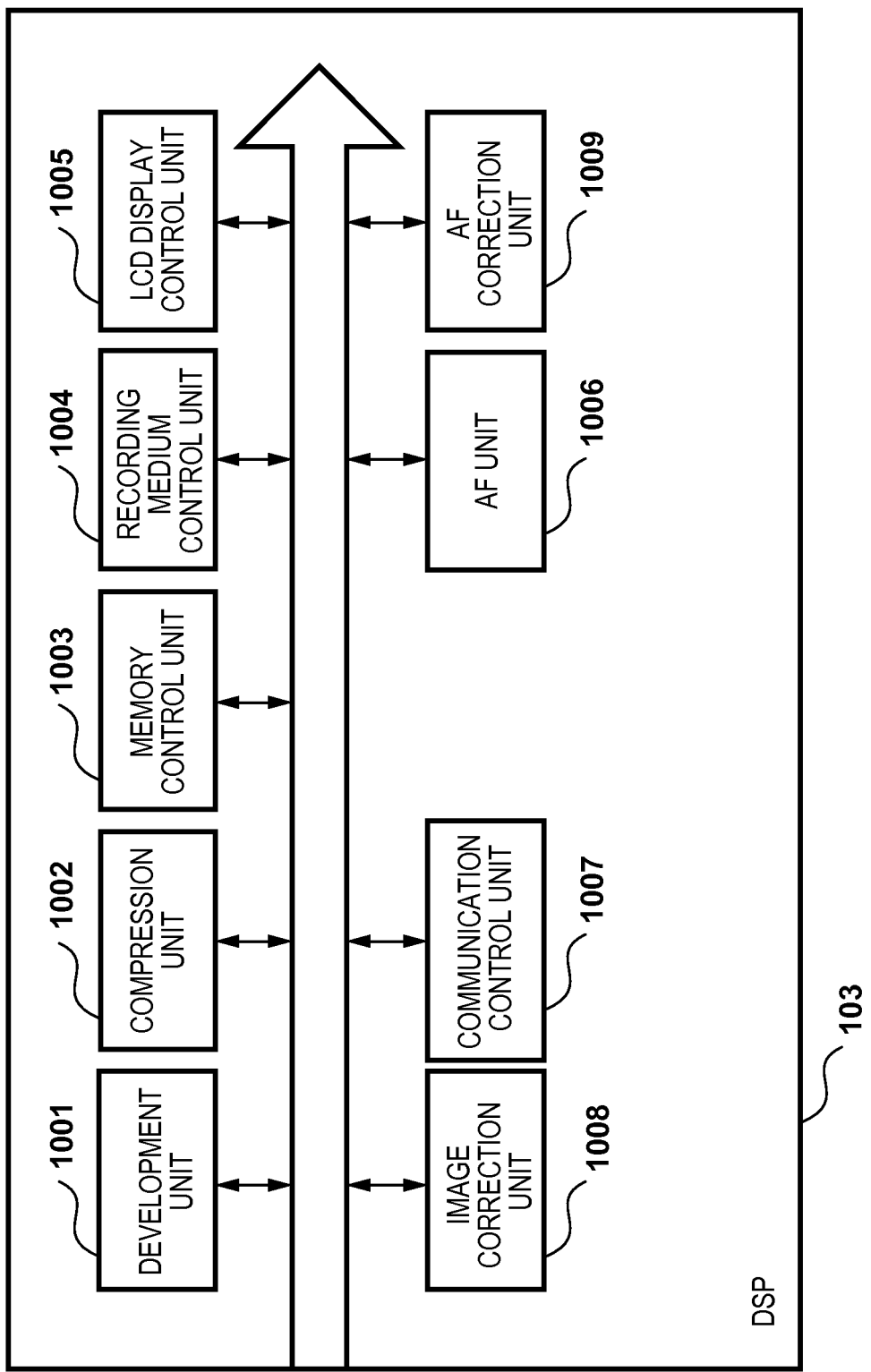
FIG. 3 is a block diagram showing a function in a DSP in this embodiment.

Next, a configuration of the DSP 103 will be described with reference to FIG. 3. The DSP 103 includes, in addition to a development unit 1001 and a compression unit 1002 which are basis of image processing described above, a memory control unit 1003, a recording medium control unit 1004, and an LCD display control unit 1005. The DSP 103 also includes an AF unit 1006 which calculates automatic focus information based on the output of the phase difference detection pixels, and a communication control unit 1007 which transmits the calculated automatic focus information to the CPU 105, and generally bidirectionally communicates with the CPU 105.

The DSP 103 also includes an image correction unit 1008 for digitally correcting an error in sensitivity or dark level from an ideal state of the image sensor 101 during image formation and AF correction unit 1009. The AF correction unit 1009 digitally corrects optical conditions before sending data to the AF unit 1006 in order to calculate automatic focus information from the output of the phase difference detection pixels. Examples of the correction of optical conditions includes correction of an error in sensitivity or dark level from an ideal state of a phase difference detection pixel, correction of the focal distance or f-number of the imaging lens 202 during shooting, and the like.

Figure 4:
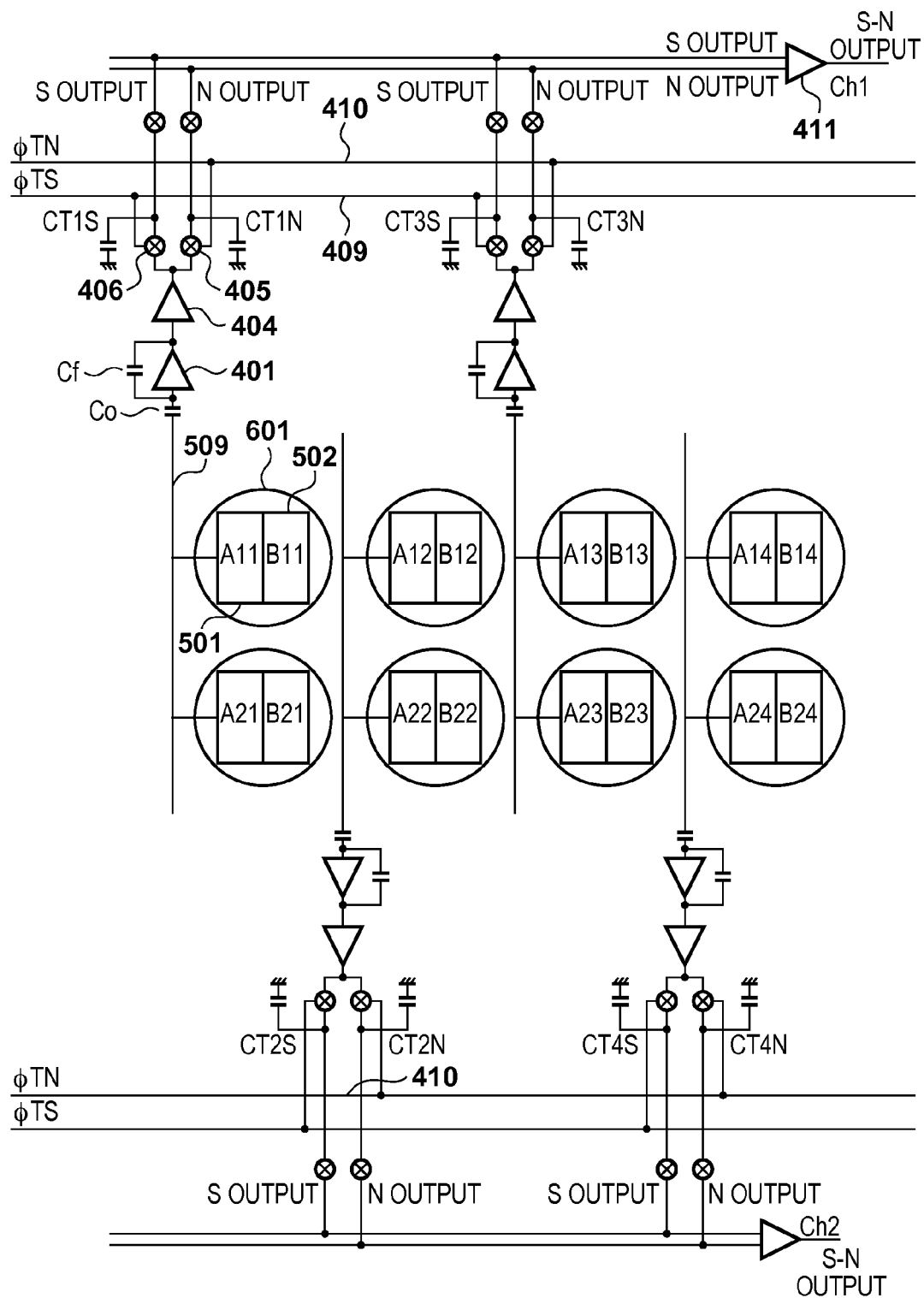
FIG. 4 is a circuit diagram of an image sensor according to the embodiment.

Next, a pixel structure of the image sensor 101 will be described. FIG. 4 is an equivalent circuit diagram showing an example configuration of the image sensor 101 of the first embodiment. In a pixel region, pixel units each including a plurality of photoelectric conversion units are arranged in a matrix and are equally spaced in the horizontal and vertical directions.

Figure 5:
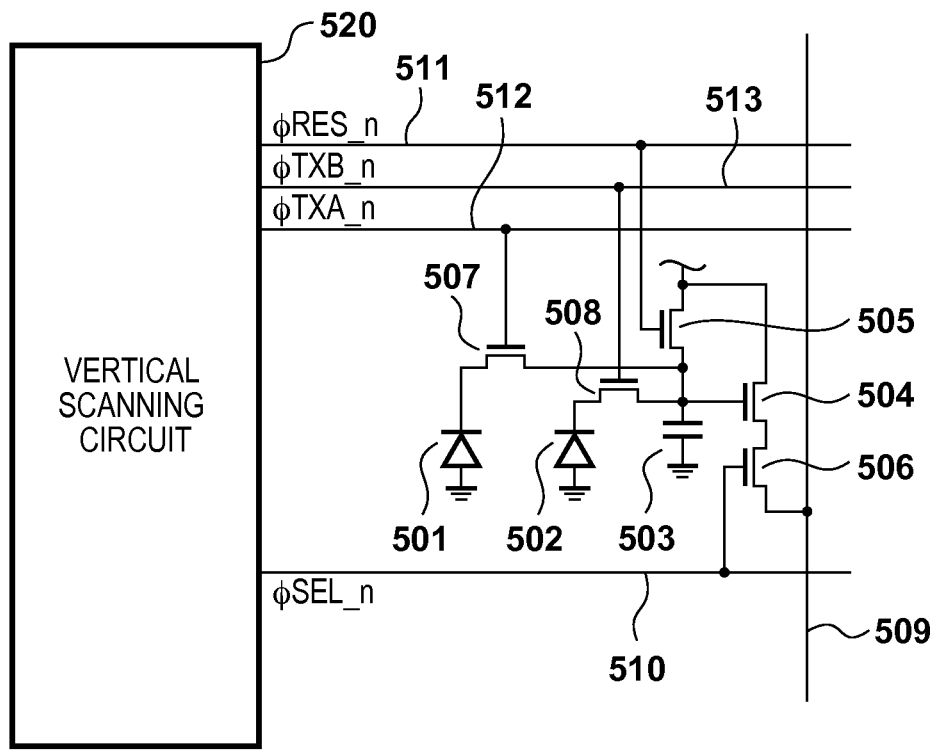
FIG. 5 is a circuit diagram of a pixel unit of the image sensor according to the embodiment.
Figure 6:
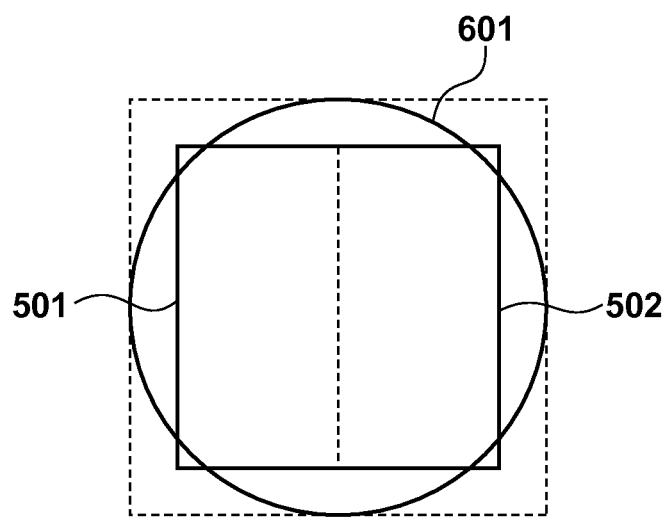
FIG. 6 is a plan view of the pixel unit of the image sensor according to the embodiment.

A configuration of the pixel unit will now be described. FIG. 5 is an equivalent circuit diagram for describing a configuration of the pixel unit in an n-th row of the image sensor 101. FIG. 6 is a plan view of the pixel unit. In FIGS. 5 and 6, photoelectric conversion units 501 and 502 are photodiodes. The photoelectric conversion units 501 and 502 are provided in a region corresponding to a single microlens 601 provided above the pixel unit. The photoelectric conversion units 501 and 502 are also referred to as an "A-pixel" and a "B-pixel," respectively, hereinafter for the sake of convenience. The microlens 601 is formed in contact with a pixel boundary indicated by a dashed line.

The A- and B-pixels are each provided in an offset position with respect to the microlens 601. Therefore, the A- and B-pixels perform photoelectric conversion on a subject image passed through respective divisions of the pupil region. By reading the outputs of the A- and B-pixels, phase difference detection can be performed, and therefore, focus detection operation can be performed. Thus, the A- and B-pixels are the above-described phase difference detection pixel.

Charges generated in the photoelectric conversion units 501 and 502 are transferred to a floating diffusion (FD) unit 503 through transfer transistors 507 and 508, respectively. The FD unit 503 is connected to the gate of an amplifier transistor 504 to form a pixel amplifier, and also functions as a charge voltage converter.

The transfer transistors 507 and 508 are each controlled according to a control signal φTXA_n which is output from a vertical scanning circuit 520 to a control line 512, and a control signal φTXB_n which is output from the vertical scanning circuit 520 to a control line 513. The transfer transistors 507 and 508 are on and off when the control signals φTXA_n and φTXB_n are H and L, respectively. Note that "n" of each control signal indicates a row. For example, the control signal φTXA_n represents a control signal φTXA which is output to pixel units in the n-th row.

When a control signal φRES_n which is output from the vertical scanning circuit 520 to a control line 511 is caused to go high, a reset transistor 505 is turned on, so that the FD unit 503 can be reset. Also, charges of the photoelectric conversion units 501 and 502 can be reset during a period of time when the control signal φRES_n and the control signals φTXA_n and φTXB_n are simultaneously high.

When a control signal φSEL_n which is output from the vertical scanning circuit 520 to a control line 510 goes high, a select transistor 506 is turned on, so that the output of the amplifier transistor 504 appears on a vertical output line 509. A constant current source (not shown) is connected to the vertical output line 509. The constant current source and the amplifier transistor 504 for each column connected to the vertical output line 509 form a source follower circuit.

FIG. 4 is a schematic diagram showing a case where four of the above pixel units are arranged in the horizontal direction and two of the above pixel units are provided in the vertical direction. Note that, in actual image sensors, about several hundreds of thousands to several tens of millions of such pixels are provided. In FIG. 4, the microlens 601 of each pixel unit, and the A- and B-pixels below the microlens 601, are schematically shown. The pixel units in each column are connected to the corresponding vertical output line 509.

The vertical output lines 509 are connected to respective column amplifiers 401 which are provided for the respective columns. The column amplifier 401 multiplies the output of the corresponding vertical output line 509 by a predetermined gain which is determined by an input capacitance C0 and a feedback capacitance Cf, and outputs the result to the follower 404 in the following stage. The follower 404 outputs this output to a noise component storage capacitor CTkN or a signal component storage capacitor CTkS through an analog switch 405 or 406. Note that k represents a column in the example of FIG. 4, and k=1 to 4. The analog switches 405 and 406 are controlled according to a control signal φTS 409 or φTN 410.

The storage capacitors CTkN and CTkS for storing a noise component and signal component of a pixel in the n-th row for each column are successively connected to inputs of an output amplifier 411 by a horizontal scanning circuit (not shown). For example, when the storage capacitors CT1N and CT1S are connected to the output amplifier 411, the output amplifier 411 multiplies a voltage difference in the first column by the predetermined gain, and outputs the result to the outside of the image sensor 101. At the next time, the storage capacitors CT3N and CT3S are connected to the output amplifier 411 by the horizontal scanning circuit. This process is repeatedly performed the same number of times as the number of columns in one row, so that a horizontal scanning operation corresponding to one row is completed. By successively performing this operation on specified rows of the image sensor 101 in the vertical direction, the outputs of predetermined pixels of the image sensor 101 can be obtained.

Also, at this time, when the outputs of the A- and B-pixels of each pixel unit are both simultaneously transferred, a charge signal generated in the entire pixel provided below the same microlens 601, which is suitable for image formation, can be output.

Unlike the image sensor of Japanese Patent Laid-Open No. 2013-106194, the column circuit of the first embodiment requires only the pair of storage capacitors CTkN and CTkS for reading either the (A+B)-signal or the A- or B-signal. In other words, the column circuit of the first embodiment has the same circuit configuration as that of an ordinary image sensor which does not include separate photoelectric conversion elements for phase difference detection, i.e., does not perform phase difference detection.

When Phase Difference Detection is not Performed

Figure 7:
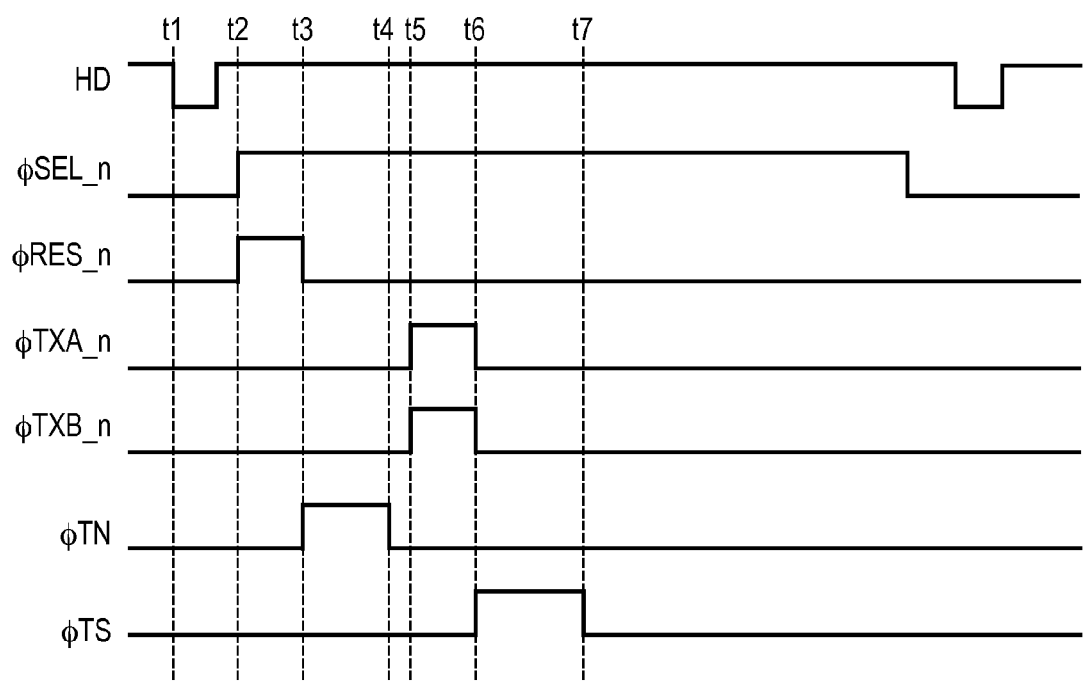
FIG. 7 is a timing chart showing driving of the image sensor when phase difference detection is not performed according to a first embodiment.

Firstly, an operation which is performed when phase difference detection is not performed, will be described with reference to a timing chart shown in FIG. 7. In FIG. 7, if a horizontal synchronization signal HD is input at time t1, the control signal φSEL_n for selecting a pixel group in the n-th row goes high at time t2 which is a predetermined time after time t1, so that the select transistors 506 of the pixels in the n-th row are turned on. As a result, a signal corresponding to the input of the amplifier transistors 504 appear on the vertical output lines 509.

At the same time, the reset signal φRES_n for the pixels in the n-th row goes high, so that the reset transistors 505 of the pixels in the n-th row are turned on. Thereafter, the reset signal φRES_n is caused to go low at time t3 which is a predetermined time after time t2, so that the reset operation is ended. As a result, a signal level at the time when the reset operation is ended appears on each of the vertical output lines 509.

At time t3, a control signal φTN simultaneously goes high, so that a signal obtained by the column amplifiers 401 amplifying the signal levels of the vertical output lines 509 at the time when the reset operation is ended, appears on the noise component storage capacitor CTkN. At time t4, if the control signal φTN is caused to go low, the signal level when the reset operation is ended is held by the noise component storage capacitor CTkN.

Next, at time t5, the control signals φTXA_n and φTXB_n are caused to go high so that the transfer transistors 507 and 508 of the A- and B-pixels, respectively, of each pixel in the n-th row are turned on. This operation allows signal charges of both of the A- and B-pixels to be transferred to the FD unit 503.

At time t6 which is a predetermined time after time t5, the control signals φTXA_n and φTXB_n are caused to go low so that the transfer transistors 507 and 508 are turned off, and the control signal φTS goes high. As a result, a signal obtained by amplifying the signal level of each of the vertical output lines 509 corresponding to the signal charge using the column amplifier 401, appears on the signal component storage capacitor CTkS. Thereafter, at time t7, when the control signal φTS is caused to go low, the signal level corresponding to the signal charge is held by the signal component storage capacitor CTkS.

At this point, the output of each pixel in the n-th row immediately after the reset operation is ended has been stored in the noise component storage capacitor CTkN of each column, and the output corresponding to the signal charge has been stored in the signal component storage capacitor CTkS of each column. Thereafter, a horizontal transfer circuit (not shown) successively connects the noise component storage capacitor CTkN and signal component storage capacitor CTkS of each column to the output amplifier 411, which then multiplies the difference by a predetermined gain and outputs the result, whereby reading of a signal (combined signal) from the A- and B-pixels in the n-th row is completed. When phase difference detection is not required, the foregoing read operation is performed.

Figure 8A:
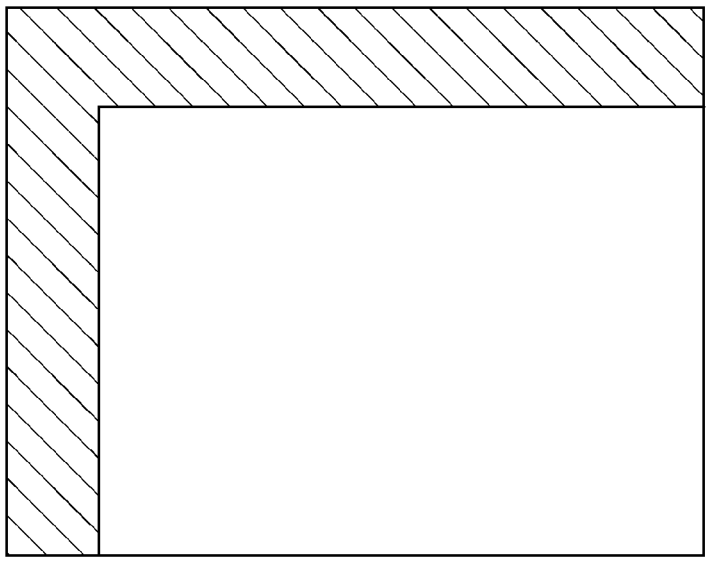
FIGS. 8A-8C are schematic diagrams for describing a method for reading the image sensor according to the first embodiment.

FIG. 8A shows the concept of the above drive method. FIG. 8A is a diagram showing a pixel unit of the image sensor 101. A portion shown by hatching in FIG. 8A indicates an optical black portion (OB portion) shielded from light. As described above, when phase difference detection is not performed, a combined signal of the A- and B-pixels is read from all pixels included in the pixel unit.

When Phase Difference Detection is Performed

Next, an operation which is performed when phase difference detection operation is performed will be described. When a phase difference detection operation is performed in the first embodiment, a combined signal of the A- and B-pixels is read out while a predetermined number of rows (a plurality of rows) are skipped between each read row in the vertical direction. After all the pixel unit has been scanned in the vertical direction, scanning is performed again from an upper row in the vertical direction. In this next scanning, only rows which have not been previously read out are scanned in the vertical direction. In the first scanning, a combined signal is read from pixels in target rows, and in the second scanning, a signal (phase difference detection signal) is read from the A- or B-pixels of pixels in target rows. Thereafter, the phase difference detection signal thus read out is used to perform phase difference detection. Such a read method is suitable for the moving image mode, and therefore, a description is given assuming that the read method is applied to the moving image mode in the first embodiment.

Figure 8B:
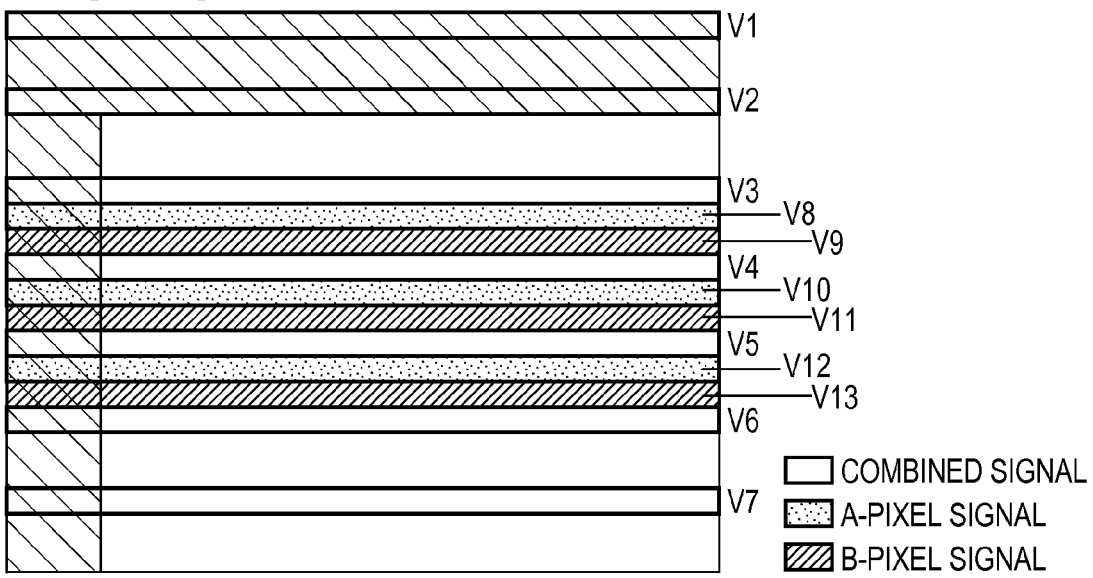

FIG. 8B is a schematic diagram showing rows which are read out in thinning readout in the vertical direction. In FIG. 8B, rows surrounded by a thick frame are to be read out, and rows not surrounded by a thick frame are to be skipped during reading. In the example of FIG. 8B, after a combined signal is read from the A- and B-pixels in a V1-th row, the vertical scanning circuit 520 controls to read out a combined signal from a V2-th row which is a third row down from the V1-th row. Thereafter, a combined signal is read from V3-th, V4-th, V5-th, V6-th, and V7-th rows at the same skip rate. The read process until this point is hereinafter referred to as a "first scanning method." The rows read out using the first scanning method output a charge signal generated in the entire region of pixel provided below each microlens 601, which is suitable for image formation, and therefore, image data can be generated from the combined signals of the V1-th to V7-th rows read out at the same skip rate.

Note that, in the first embodiment, reading is performed in the horizontal direction without skipping, and therefore, there is a difference in the number of pixels read out between the horizontal direction and the vertical direction, so that the image aspect ratio (width-to-height ratio) is altered. Accordingly, the aspect ratio may be modified in a subsequent stage, or general thinning readout or addition thinning readout may be performed at the same skip rate in the horizontal direction. Thus, the aspect ratio may be modified using any technique.

After reading is performed using the first scanning method until the V7-th row, the vertical scanning circuit 520 controls to return to a V8-th row, and read a phase difference detection signal from the A-pixels of the pixels in the V8-th row. Thereafter, a phase difference detection signal is read from the B-pixels of the pixels in a V9-th row next to the V8-th row. Thereafter, the V4-th row, which has already been read out in the first scanning method, is skipped, and the A-pixels in a V10-th row and the B-pixels in a V11-th row next to the V10-th row are read out. Similarly, the V5-th row, which has already been read out in the first scanning method, is skipped, and a V12-th row and a V13-th row next to the V12-th row are read out. The drive method for the V8-th row and the following rows is here referred to as a "second scanning method." Thus, in the second scanning method, of the pair of two rows successively read out, a signal is read only from the A-pixels in the row which is read out earlier, and a signal is read only from the B-pixels in the row which is read out later. Note that a region (second region) which is read out using the second scanning method includes a focus detection region set in advance for detecting a focus state, and is smaller than a region (first region) which is read out using the first scanning method. The focus detection region may be a desired region specified by the user operating an operation unit (not shown), or may be automatically set using a known technique, such as subject detection or the like, or may be a fixed region. The second scanning method is performed in order to read focus detection signals, and therefore, the second region is preferably a smallest region including the focus detection region.

Figure 8C:
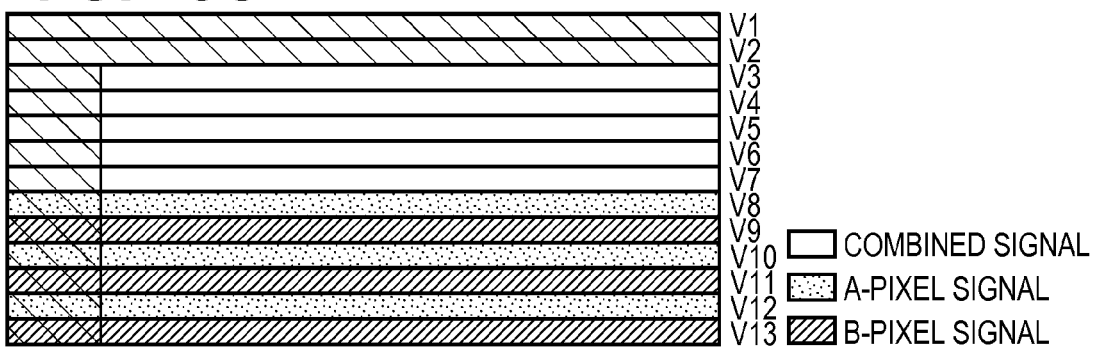

FIG. 8C is a schematic diagram showing a rearrangement of pixels in an order in which the pixels are to be processed according to the order in which the pixels have been read out in the above fashion. As described above, in the V1-th to V7-th rows, a combined signal is read from the A- and B-pixels using the first scanning method, and therefore, this output can be used to perform normal image formation. In each of the V8-th to V13-th rows, a focus detection signal is read out from the A- or B-pixels using the second scanning method, and therefore, the outputs of the pair of the A- and B-pixels obtained from each pair of two rows can be used to perform phase difference detection.

As a phase difference detection method in this case, if the image sensor 101 has a color filter having a Bayer array, a correlation between a G-pixel signals in one of the pair of two rows successively read out, from which the A-pixels are read out earlier, and a G-pixel signals in the other row from which the B-pixels are read out later, is calculated.

Figure 9:
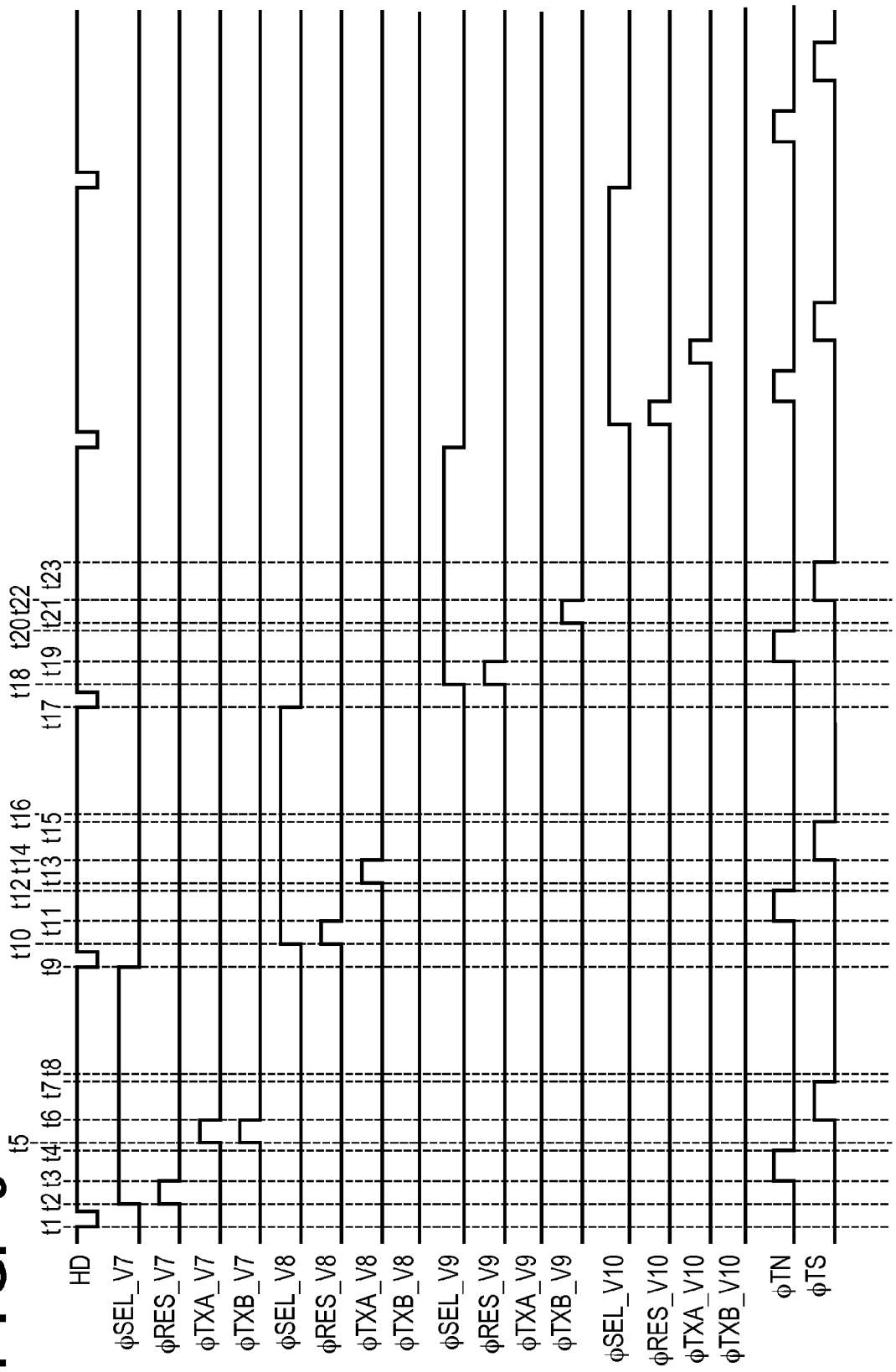
FIG. 9 is a timing chart showing driving of the image sensor when phase difference detection is performed according to the first embodiment.

Next, drive using the first scanning method will be described with reference to a timing chart shown in FIG. 9. Here, a read operation from the V7-th row, which is the last row, in the first scanning method will be described. In FIG. 9, when the horizontal synchronization signal HD is input at time t1, a control signal ϕSEL_V7 for selecting a pixel group in the V7-th row goes high at time t2 which is a predetermined time after time t1, so that the select transistors 506 of the pixels in the V7-th row are turned on. As a result, a signal corresponding to an input to the amplifier transistors 504 appears on the vertical output lines 509. At the same time, a reset signal ϕRES_V7 for the pixels in the V7-th row goes high, so that the reset transistors 505 of the pixels in the V7-th row are turned on.

Thereafter, at time t3 which is a predetermined time after time t2, the reset signal ϕRES_V7 is caused to go low, so that the reset operation is ended. As a result, a signal level at the time when the reset operation is ended appears on the vertical output lines 509. At time t3, the control signal ϕTN simultaneously goes high, and a signal obtained by amplifying the signal level of each of the vertical output lines 509 when the reset operation is ended using the column amplifier 401, appears on the noise component storage capacitor CTkN. At time t4, when the control signal ϕTN 410 is caused to go low, the signal level when the reset operation is ended is held by the noise component storage capacitor CTkN.

Next, at time t5, control signals ϕTXA_V7 and ϕTXB_V7 are caused to go high so that the transfer transistors 507 and 508 of the A- and B-pixels, respectively, in the V7-th row are turned on. By this operation, signal charges of both the A- and B-pixels are transferred to the respective FD units 503. Moreover, at time t6 which is a predetermined time after time t5, when the transfer transistors 507 and 508 are turned off, signal charges of the A- and B-pixels are both held by the FD units 503. Moreover, at time t6, when the control signal ϕTS goes high, a signal obtained by amplifying the signal level of each of the vertical output lines 509 corresponding to the signal charge using the column amplifier 401, appears on the signal component storage capacitor CTkS. At time t7, when the control signal ϕTS is caused to go low, a signal level corresponding to the signal charge is held by the signal component storage capacitor CTkS.

At this point, the output of each pixel in the V7-th row immediately after the reset operation is ended has been stored in the noise component storage capacitor CTkN in the corresponding column, and the output corresponding to the signal charge has been stored in the signal component storage capacitor CTkS in the corresponding column. Thereafter, the noise component storage capacitor CTkN and signal component storage capacitor CTkS of each column are successively connected to the output amplifier 411 by the horizontal transfer circuit (not shown), the difference is multiplied by a predetermined gain, and the result is output, whereby reading of a combined signal in the V7-th row is completed. Although the operation for the V7-th row has been described so far, the same is true for the V1-th to V6-th rows.

Next, at time t9, when the next horizontal synchronization signal HD is input, the control signal ϕSEL_V7 which has so far selected the V7-th row goes low. Thereafter, at time t10 which is a predetermined time after time t9, a control signal ϕSEL_V8 for selecting a pixel group in the V8-th row goes high, so that the select transistors 506 of the pixels in the V8-th row are turned on. As a result, a signal corresponding to the input of the amplifier transistor 504 appears on each of the vertical output lines 509. At the same time, a reset signal ϕRES_V8 for the pixel in the V8-th row goes high, so that the reset transistors 505 of the pixels in the V8-th row are turned on.

Thereafter, at time t11 which is a predetermined time after time t10, the reset signal φRES_V8 is caused to go low, so that the reset operation is ended. As a result, a signal level at the time when the reset operation is ended appears on the vertical output lines 509. At time t11, the control signal φTN simultaneously goes high, so that a signal obtained by amplifying the signal level of each of the vertical output lines 509 when the reset operation is ended using the column amplifier 401, appears on the noise component storage capacitor CTkN. At time t12, when the control signal φTN is caused to go low, the signal level at the time when the reset operation is ended is held by the noise component storage capacitor CTkN.

Next, at time t13, in order to turn on the transfer transistors 507 only for the A-pixels of the pixels in the V8-th row, a control signal φTXA_V8 is caused to go high, and a control signal φTXB_V8 is caused to go low. By this operation, signal charge of only the A-pixels is transferred to the FD units 503. Moreover, at time t14 which is a predetermined time after time t13, when the transfer transistors 507 are turned off, this operation allows signal charge of only the A-pixels to be held by the FD units 503. Moreover, at time t14, when the control signal φTS goes high, a signal obtained by amplifying the signal level of each of the vertical output lines 509 corresponding to the signal charge using the column amplifier (401), appears on the signal component storage capacitor CTkS. At time t15, when the control signal φTS is caused to go low, a signal level corresponding to the signal charge is held by the signal component storage capacitor CTkS.

At this point, the output of each pixel in the V8-th row immediately after the reset operation is ended has been stored in the noise component storage capacitor CTkN in the corresponding column, and the output corresponding to the signal charge has been stored in the signal component storage capacitor CTkS in the corresponding column. Thereafter, the horizontal transfer circuit (not shown) successively connects the noise component storage capacitor CTkN and signal component storage capacitor CTkS of each column to the output amplifier 411, which then multiplies the difference by a predetermined gain and outputs the result, whereby reading of a signal only from the A-pixels in the V8-th row is completed.

Next, at time t17, when the next horizontal synchronization signal HD is input, the control signal φSEL_V8 which has so far selected the V8-th row goes low. Thereafter, at time t18 which is a predetermined time after time t17, a control signal φSEL_V9 for selecting a pixel group in the V9-th row goes high, so that the select transistors 506 of the pixels in the V9-th row are turned on. As a result, a signal corresponding to the input of the amplifier transistors 504 appears on the vertical output lines 509. At the same time, a reset signal φRES_V9 for the pixel in the V9-th row goes high, so that the reset transistors 505 of the pixel in the V9-th row are turned on. Thereafter, at time t19 which is a predetermined time after time t18, the reset signal φRES_V9 is caused to go low, so that the reset operation is ended. As a result, a signal level at the time when the reset operation is ended on the vertical output lines 509. At time t19, the control signal φTN simultaneously goes high, so that a signal obtained by amplifying the signal level of each of the vertical output lines 509 at the time when the reset is ended using the column amplifier 401, appears on the noise component storage capacitor CTkN. At time t20, when the control signal φTN is caused to go low, the signal level at the time when the reset operation is ended is held by the noise component storage capacitor CTkN.

Next, at time t21, in order to turn on the transfer transistors 507 of only the B-pixels of the pixels in the V9-th row, a control signal φTXA_V9 is caused to go low, and a control signal φTXB_V9 is caused to go high. Moreover, at time t22 which is a predetermined time after time t21, the control signal φTXB_V9 is caused to go low, so that the transfer transistors 507 are turned off, this operation causes signal charge of only the B-pixels to be transferred to the FD units 503. Moreover, at time t22, when the control signal φTS goes high, a signal obtained by amplifying the signal level of each of the vertical output lines 509 corresponding to the signal charge using the column amplifier 401, appears on the signal component storage capacitor CTkS. At time t23, when the control signal φTS is caused to go low, a signal level corresponding to the signal charge is held by the signal component storage capacitor CTkS.

At this point, the output of each pixel in the V9-th row immediately after the reset operation is ended has been stored in the noise component storage capacitor CTkN in the corresponding column, and the output corresponding to the signal charge has been stored in the signal component storage capacitor CTkS in the corresponding column. Thereafter, the horizontal transfer circuit (not shown) successively connects the noise component storage capacitor CTkN and signal component storage capacitor CTkS of each column to the output amplifier 411, which then multiplies the difference with a predetermined gain and outputs the result, whereby reading of a signal only from the B-pixels in the V9-th row is completed.

Thereafter, similarly, a signal is read only from the A-pixels in the V10-th row, and a signal is read only from the B-pixels in the V11-th row. Thus, by repeating this read operation, the desired read operation is completed.

Image Shooting Operation

Figure 10:
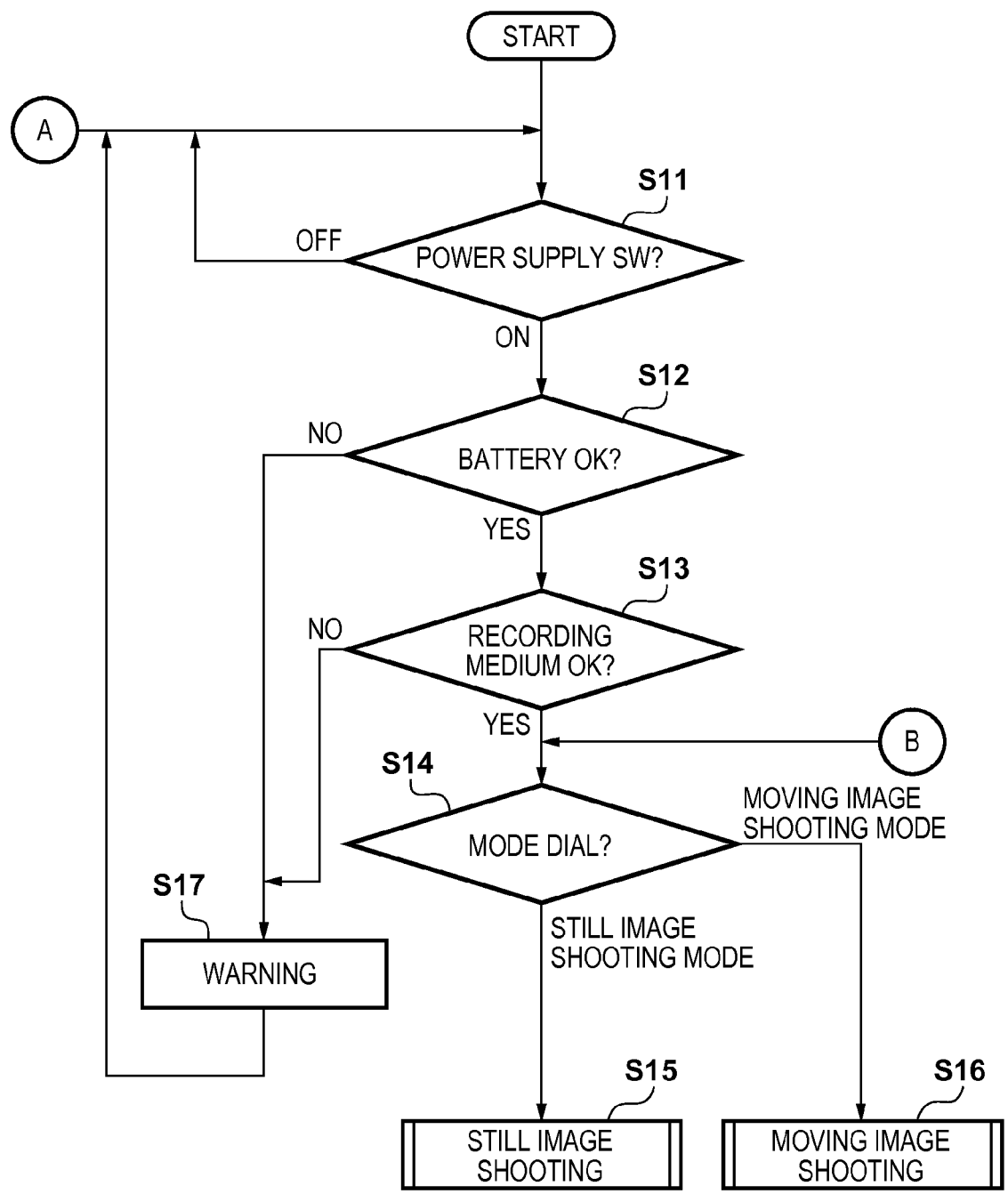
FIG. 10 is a flowchart showing an image shooting operation of the image capturing apparatus according to the first embodiment.

Next, an image shooting operation of the image capturing apparatus of the first embodiment will be overviewed with reference to a flowchart shown in FIG. 10. The CPU 105, when the power supply switch 109 is turned on (step S11), determines whether or not electrical energy required for image shooting remains in a battery (step S12). As a result, if electrical energy required for image shooting does not remain in a battery, the CPU 105 displays a warning message indicating that situation on the display unit 114 (step S17), returns to step S11, and waits until the power supply switch 109 is turned on again.

If electrical energy required for shooting remains in a battery, the CPU 105 checks the recording medium 108 (step S13). This checking is performed to determine whether or not the recording medium 108 which can record a predetermined amount or more of data has been loaded in the image capturing apparatus. If the recording medium 108 which can record a predetermined amount or more of data has not been loaded in the image capturing apparatus, the CPU 105 displays a warning message indicating that situation on the display unit 114 (step S17), and returns to step S11.

If the recording medium 108 which can record a predetermined amount or more of data has been loaded in the image capturing apparatus, the CPU 105 determines whether the image shooting mode set by the mode dial 112 is the still image shooting mode or the moving image shooting mode (step S14). Thereafter, if the still image shooting mode is set, the CPU 105 performs a still image shooting process (step S15), and if the moving image shooting mode is set, the CPU 105 performs a moving image shooting process (step S16).

Figure 11:
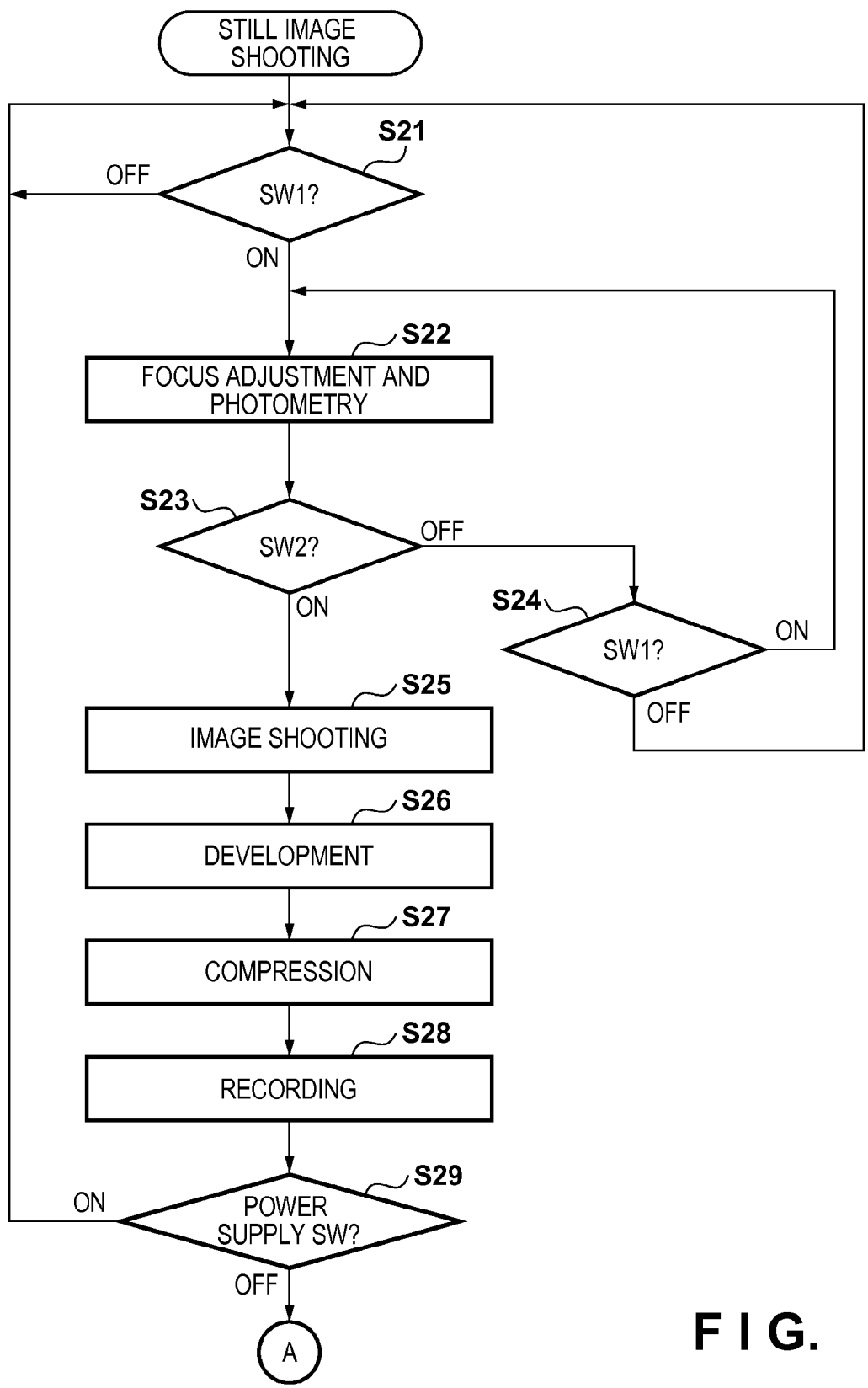
FIG. 11 is a flowchart showing a still image shooting process according to the first embodiment.

A still image shooting process performed in step S15 will now be described in detail with reference to a flowchart shown in FIG. 11. In the still image shooting process, the CPU 105 initially waits until the shutter switch SW1 is turned on (step S21). When the shutter switch SW1 is turned on, the CPU 105 performs a photometric process in which the f-number and shutter speed of the diaphragm 204 of the imaging lens 202 are determined using photometric information from a photometric control unit (not shown). The CPU 105 also performs a focus adjustment process to move the focus adjustment lens group 205 of the imaging lens 202 to focus on a subject, using focus detection information from the AF unit 209 (step S22).

Next, the CPU 105 determines whether or not the shutter switch SW2 is turned on (step S23). As a result, if the shutter switch SW2 is not turned on, the CPU 105 determines whether or not the shutter switch SW1 is still on (step S24). If the shutter switch SW1 is still on, the CPU 105 returns to step S23, in which the CPU 105 then determines whether or not the shutter switch SW2 is turned on. On the other hand, if the shutter switch SW1 is not on, the CPU 105 returns to step S21, in which the CPU 105 then waits until the shutter switch SW1 is turned on again.

If, in step S23, the CPU 105 determines that the shutter switch SW2 is turned on, the CPU 105 performs an image shooting process (step S25). During still image shooting, a combined signal of the A- and B-pixels is read from the entire region of the image sensor 101 by the above drive method without phase difference detection, as shown in FIG. 8A. As a result, a charge signal generated in the entire pixel provided below each microlens 601, which is suitable for image formation, can be output.

Next, the CPU 105 causes the DSP 103 to perform a development process on the combined signal thus obtained (image data) (step S26). The CPU 105 also causes the DSP 103 to perform a compression process on image data on which the development process has been performed, and stores the image data on which the compression process has been performed to an empty region of the RAM 107 (step S27). Next, the CPU 105 causes the DSP 103 to read image data stored in the RAM 107, and perform a recording process on the recording medium 108 (step S28).

Thereafter, the CPU 105 checks whether the power supply switch 109 is on or off (step S29). If the power supply switch 109 is still on, the CPU 105 returns to step S21, in which the CPU 105 then prepares for the next image shooting. On the other hand, if the power supply switch 109 is off, the CPU 105 returns to step S11 of FIG. 6, in which the CPU 105 then waits until the power supply switch 109 is turned on again.

Figure 12:
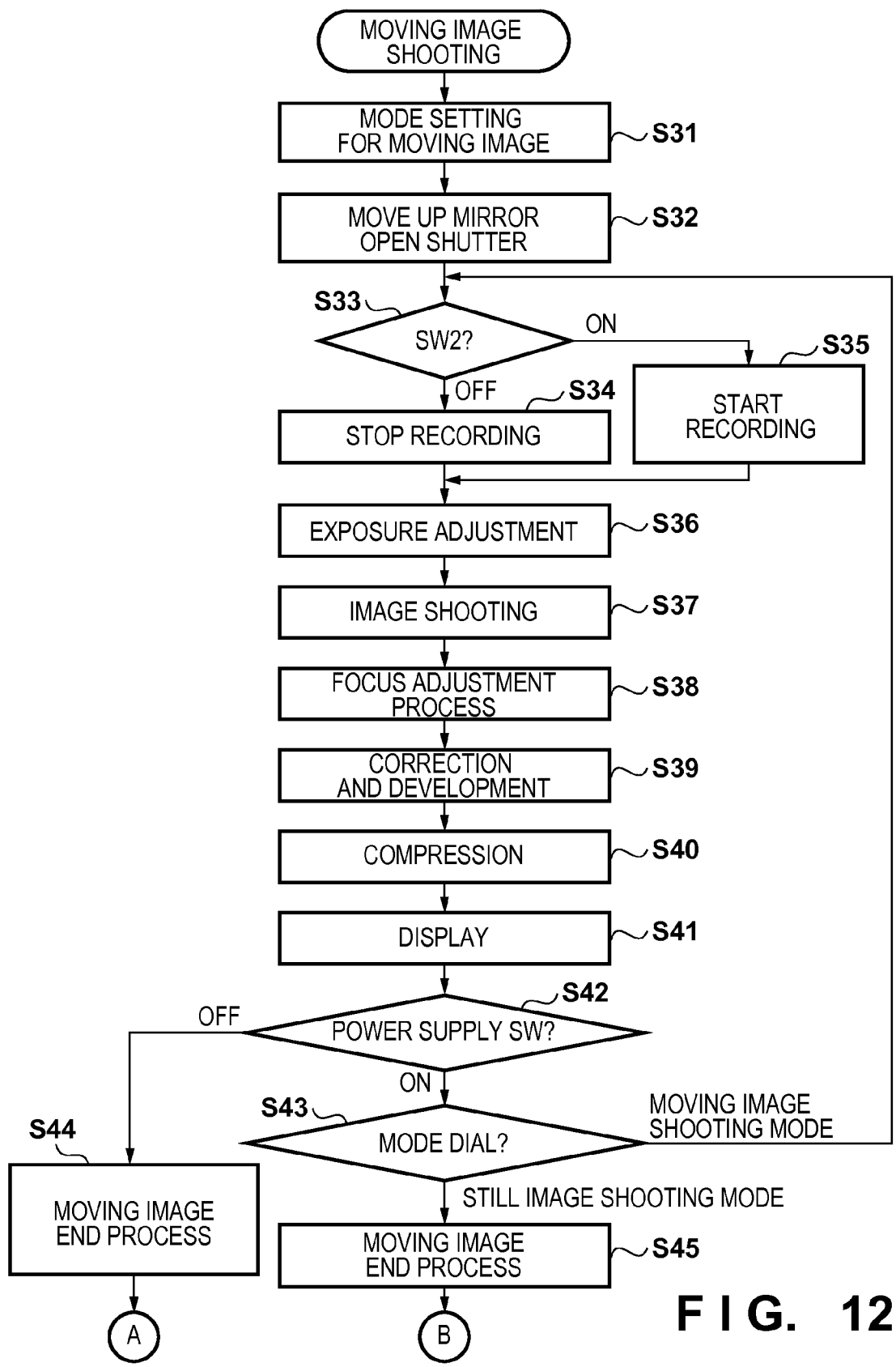
FIG. 12 is a flowchart showing a moving image shooting process according to the first embodiment.

Next, the moving image shooting process performed in step S16 will be described in detail with reference to a flowchart shown in FIG. 12. Note that, in the first embodiment, if the moving image shooting mode is set, a monitoring operation in which the shutter 210 is opened, and image data continuously read from the image sensor 101 is developed and then displayed on the display unit 114 is performed. Also, it is assumed that while the shutter switch SW2 is on, moving image data continues to be recorded on the recording medium 108. In order to end the moving image shooting mode, the mode dial 112 is changed to modes other than the moving image shooting mode, or the power supply switch 109 is turned off.

Initially, the CPU 105 is set to the moving image shooting mode selected by the mode dial 112 (step S31), and then opens the main mirror 207, the sub-mirror 208, and the focal plane shutter 210 (step S32). As a result, as shown in FIG. 2B, an image of a subject is always incident on the image sensor 101.

Next, the CPU 105 determines whether or not the shutter switch SW2 is on (step S33). If the shutter switch SW2 is on, the CPU 105 starts a recording operation of writing moving image data to the recording medium 108 (step S35). On the other hand, if the shutter switch SW2 is off, then when the CPU 105 is currently performing the recording operation of writing moving image data to the recording medium 108, the CPU 105 stops the recording operation (step S34). Thus, the CPU 105 continues to perform the process of recording moving image data while the shutter switch SW2 is on, and stops the process of recording moving image data when the shutter switch SW2 is turned off. Note that the CPU 105 may also stop the recording operation when a predetermined time has elapsed or when the free space of the recording medium 108 has become small, even when the shutter switch SW2 is not turned off.

After step S34 or S35, the CPU 105 performs exposure adjustment in order to perform the monitoring operation of repeatedly performing monitoring display of image data on the display unit 114 (step S36). In the exposure adjustment, the exposure amount is determined based on the latest image data which has just been captured, and the diaphragm 204 of the imaging lens 202 or the gain in the AFE 102 are set so that an appropriate exposure amount is obtained. Note that when starting moving image shooting, the latest image data does not exist yet, and therefore, the diaphragm 204 of the lens and the gain in the AFE 102 are set to their initial values.

Next, in step S37, the CPU 105 performs an image shooting process. In the moving image shooting mode, driving including the above phase difference detection is performed. Initially, as described with reference to FIGS. 8B and 8C, pixels on the image sensor 101 are read out using the first scanning method every three rows in the vertical direction. After the end of scanning using the first scanning method, reading is performed using the second scanning method in order to obtain a phase difference detection signal. Note that rows (second region) which are read out in the second scanning method are specified depending on the focus detection region in which AF is performed.

The phase difference detection signal read out using the second scanning method is transferred to the AF correction unit 1009 in the DSP 103. Thereafter, the AF correction unit 1009 selects signals of only pixels on which the G filter of the Bayer array is provided, and performs correction on a pixel-by-pixel basis, or correction corresponding to optical conditions during image shooting.

Thereafter, the result of the correction is transferred to the AF unit 1006. Based on the A-pixel signal and the B-pixel signal which are two types of pixel outputs corresponding to the different pupil regions, the phase difference is calculated using known correlation calculation or the like in the AF unit 1006, to perform a focus detection operation. The CPU 105 receives the calculation result, and controls the position of the focus adjustment lens group 205 in the imaging lens 202, thereby performing an automatic focus control (step S38).

On the other hand, for the combined signal obtained from the image sensor 101 using the first scanning method, the image correction unit 1008 digitally corrects an error in sensitivity or dark level of the image sensor 101 from an ideal state. Moreover, the development unit 1001 performs a correction process on a defective pixel in the image sensor 101, and also performs a development process (step S39). The compression unit 1002 performs a compression process (step S40). If the shutter switch SW2 is on at that time, and a moving image is being recorded, a compressed image signal is recorded on the recording medium 108. Thereafter, these process results are displayed on the display unit 114 using the LCD display control unit 1005 (step S41). By repeatedly performing the above operation at a frame rate required for displaying, an operation for a moving image can be achieved.

Next, the CPU 105 determines whether or not the power supply switch 109 is off (step S42). If the power supply switch 109 is off, the CPU 105 performs a moving image shooting end process (step S44), and the process returns to step S11 of FIG. 12. On the other hand, if the power supply switch 109 is still on (YES in step S42), the CPU 105 checks the mode dial 112 (step S43). If the mode dial 112 is still set on the moving image shooting mode, the process returns to step S33. If the mode dial 112 has been changed to the still image mode, the CPU 105 performs the moving image shooting end process (step S45), and the process returns to step S14 of FIG. 10.

In the moving image shooting end process of steps S44 and S45, if recording operation is being currently performed, the recording operation is stopped, the driving of the image sensor 101 is stopped, and the process of the DSP 103 is stopped. Moreover, the focal plane shutter 210 is closed, and the main mirror 207 and the sub-mirror 208 are moved down.

Thus, in the moving image shooting mode, a moving image can be generated using a combined signal read out using the first scanning method while skipping rows in the vertical direction, and a phase difference can be calculated using phase difference detection signals read out later using the second scanning method. Thereafter, during moving image shooting, by alternately repeating the first scanning method and the second scanning method, an automatic focus control using only the output of the image sensor can be achieved while maintaining the quality of image data of a moving image.

Thus, image data is output in order of a combined signal for image formation and a signal for phase difference detection, and therefore, process steps and a correction process of the image data can be separated in time. Therefore, it is no longer necessary to separate a phase difference detection signal from a read signal, one for the development process, and the other for the AF unit for the phase difference detection calculation. It is also no longer necessary to correct a phase difference detection signal in order to generate image data. Therefore, process efficiency can be significantly improved.

Also, the reading of the image sensor in the moving image shooting mode in the first embodiment is controlled so that when a combined signal for a moving image is read out, a phase difference detection signal is not read out. Therefore, when image data of a moving image is obtained, there is not a risk of a deterioration in image quality due to a phase difference detection signal. Moreover, the phase difference detection operation can perform detection in any region by switching operating methods of the vertical scanning circuit.

Also, in the first embodiment, in the moving image shooting mode, a moving image is generated based on a combined signal read out using the first scanning method performed earlier, and automatic focus information is calculated based on phase difference detection signals read out using the second scanning method performed later. However, the present invention is not limited to this. Automatic focus information may be calculated based on phase difference detection signals read out using the second scanning method performed earlier, and thereafter, a moving image may be generated based on a combined signal read out using the first scanning method performed later. In this case, automatic focus information can be detected earlier, and therefore, advantageously, the lens can be driven earlier. This can be easily achieved because the scanning order of vertical scanning circuit 520 is only changed. Also, these drive methods performed by the CPU 105 may be switched and set on a frame-by-frame basis, for example.

As described above, according to the first embodiment, a pixel unit including a plurality of photoelectric conversion units is provided, and a function is added to a logic circuit in the vertical scanning circuit, whereby the reading method can be switched between reading of the (A+B)-pixels and reading of either the A-pixels or the B-pixels, for each read row. As a result, a required pixel signal can be read out with accuracy sufficient for phase difference detection, without an increase in circuit scale and without a decrease in image quality.

Also, pixel signals for phase difference detection are read only from a required region, and therefore, it is not necessary to read a combined signal and a phase difference detection signal from all pixels. As a result, the read time is significantly reduced, whereby the read operation can be performed at higher speed.

Also, it is not necessary to perform read operation such that an image signal and a phase difference detection signals are read out from all pixels only in specified rows. Therefore, it is not necessary to perform a complicated control such that only the specified rows are read out at a different horizontal scanning period. As a result, a related-art system can be easily modified to achieve the present invention.

Second Embodiment

Figure 13A:
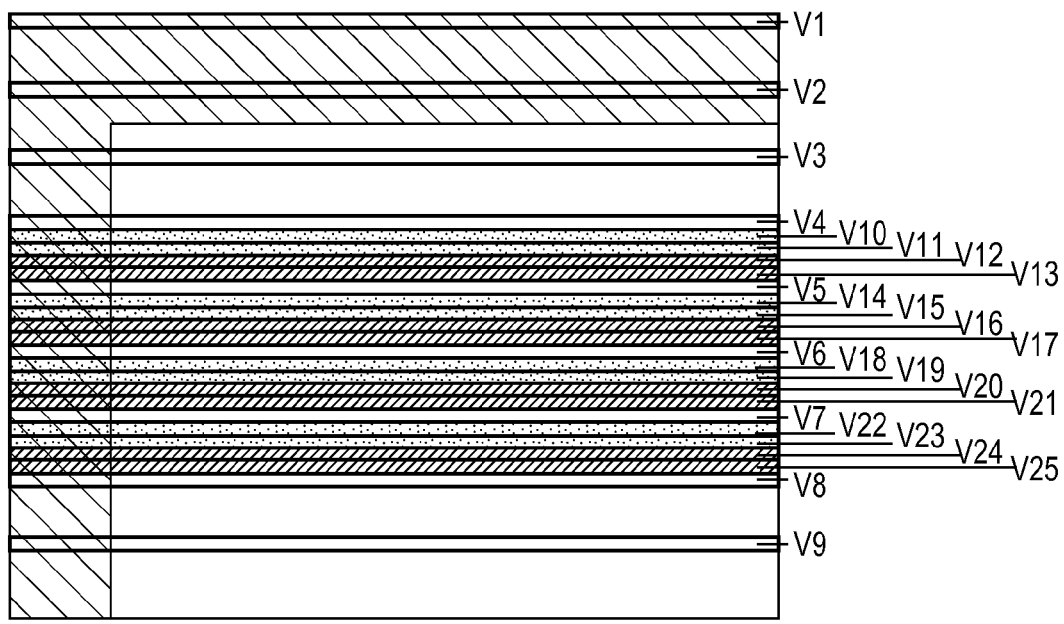
FIGS. 13A and 13B are schematic diagrams for describing a method for reading an image sensor according to a second embodiment.
Figure 13B:
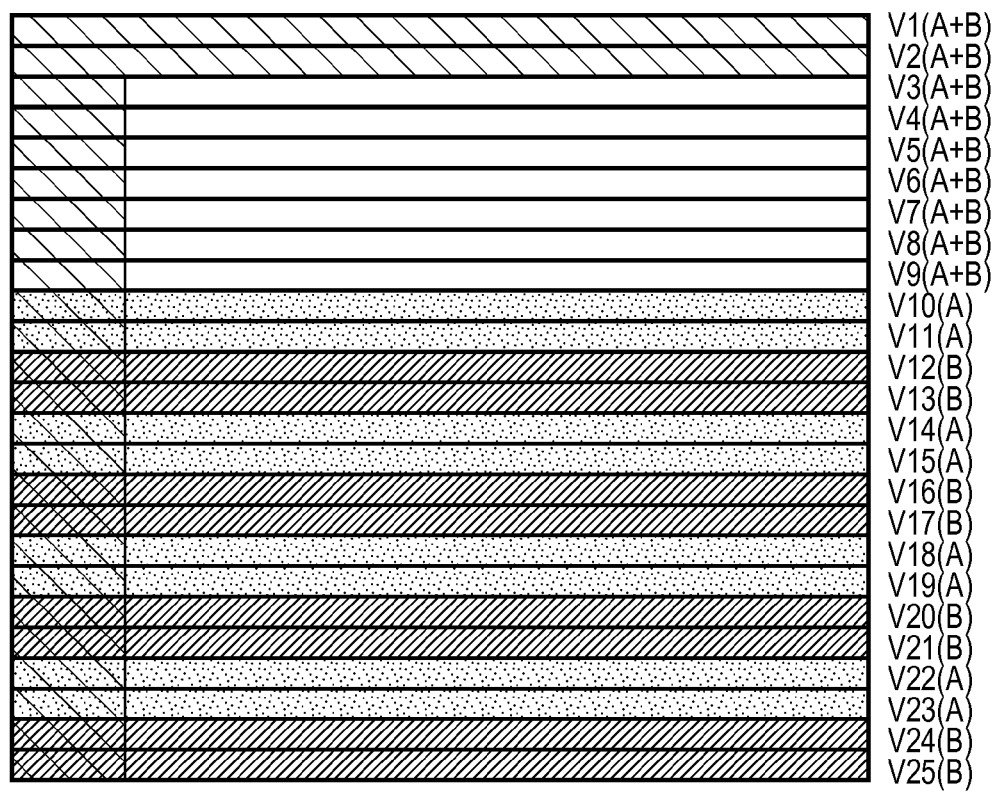

Next, a second embodiment according to the present invention will be described. In the first embodiment, it has been described that two rows are successively read out using the second scanning method, and phase difference detection is performed using an A-pixel signal output from G-filter pixels in the row which is read out earlier, and a B-pixel signal output from G-filter pixels in the row which is read out later. In contrast to this, in the second embodiment, initially, a combined signal for image data is read out every five rows, i.e., while four rows are skipped between each read row, and next, the four skipped rows are successively read out. In the latter readout, the image sensor is driven so that a signal is read out from the A-pixels in the two rows which are read out earlier, and a signal is read out from the B-pixels in the two rows which are read out later, and phase difference detection is performed using all pixel information of the Bayer filter array. FIGS. 13A and 13B show the concept of an image read out in this case.

Note that a drive control for reading a combined signal and a drive control for reading phase difference detection signals are similar to those described in the first embodiment, and can be freely switched by the vertical scanning circuit.

FIG. 13A is a schematic diagram showing read rows in a case where phase difference detection is performed in the second embodiment. In FIG. 13A, rows surrounded by a thick frame are to be read out, and rows not surrounded by a thick frame are to be skipped during reading. Specifically, after reading out a V1-th row, the vertical scanning circuit 520 reads a V2-th row which is the fifth row down from the V1-th row. Thereafter, V3-th, V4-th, V5-th, V6-th, V7-th, V8-th, and V9-th rows are read out at the same skip rate. The process until this point is referred to as a "third scanning method."

After performing reading using the third scanning method until the V9-th row, the vertical scanning circuit 520 returns a row to be read to a V10-th row, and reads the V10-th row, and thereafter, successively reads out V11-th, V12-th, and V13-th rows. Thereafter, the V5-th row, which has already been read out using the third scanning method, is skipped, and V14-th to V17-th rows are then read out. Thereafter, similarly, the V6-th row, which has already been read out using the third scanning method, is skipped, and V18-th to V21-th rows are then read out. Thereafter, the V7-th row, which has already been read out using the third scanning method, is skipped, and V22-th to V25-th rows are then read out. The drive method for the V10-th row and the following rows is referred to as a "fourth scanning method."

Next, reading of a pixel in each read row will be described. In the third scanning method, as described above, a combined signal is read out from the A- and B-pixels in each row. The rows read out using the third scanning method output a charge signal generated in the entire pixel provided below each microlens 601, which is suitable for image formation. Therefore, image data can be generated from the combined signals of the V1-th to V9-th rows read out using the third scanning method.

Note that, in the second embodiment, reading is performed in the horizontal direction without skipping, and therefore, there is a difference in the number of pixels read out between the horizontal direction and the vertical direction, so that the image aspect ratio (width-to-height ratio) is altered. Accordingly, the aspect ratio may be modified in a subsequent stage, or general thinning readout or addition thinning readout may be performed at the same skip rate in the horizontal direction. Thus, the aspect ratio may be modified using any technique.

Next, of the group of four rows successively read out in the fourth scanning method, only the pixel signals of the A-pixels areread out in the two rows which are read out earlier, and only the pixel signals of the B-pixel are read out in the two rows which are read out later. FIG. 13B is a schematic diagram showing a rearrangement of pixels in an order in which the pixels are to be processed according to the order in which the pixels have been read out in the above fashion.

As described above, a combined signal of the A- and B-pixels is read out in the V1-th to V9-th rows using the third scanning method, and this output can be used to perform normal image formation. On the other hand, the V10-th to V25-th rows include pairs of two successive rows in which only the A-pixels are read out using the fourth scanning method, and pairs of two adjacent successive rows in which the B-pixels are read out. By using the A-pixel output and B-pixel output of the two-row pairs, phase difference detection can be performed. As a method for phase difference detection in this case, both the A-pixel signal and the B-pixel signal each includes all pixel information of the Bayer filter array, and therefore, all the color information can be used to perform phase difference detection.

Of course, other methods may be achieved only by changing the settings of the vertical scanning circuit 520. While the skip rate in the vertical direction of the third scanning method may be set to 1/5, the two successive rows may be a row in which the A-pixels are read out and a row in which the B-pixels are read out, in the fourth scanning method, as in the first embodiment.

As described above, according to the second embodiment, in addition to the advantages of the first embodiment, all pixel signals read out using the fourth scanning method can be used for phase difference detection. Thus, by changing the settings of the vertical scanning circuit 520, rows used for image formation, and rows used for phase difference detection, can be set with high flexibility, and therefore, various settings may be made, depending on the quality of an image, the accuracy of phase difference detection, a detection region, a combined read rate (frame rate), or the like.

<Variations>

In addition to the first and second embodiments described above, various other embodiments can be made. Various settings can be made, depending on the image quality of the image formation region which is used in phase difference detection, the accuracy of phase difference detection, or the like.

Also, the pixels of the image sensor have a similar configuration except for the color filter. Therefore, by changing the configuration of the vertical scanning circuit 520, any row can be selected as a read row in which phase difference detection is performed.

Also, in the above embodiments, a method for performing reading in the horizontal direction has not been described. Even when skipping, addition of the same color, or an arithmetic means process is performed in the horizontal direction, the invention of this embodiment is applicable.

Also, it has not been described above that the embodiments are applied to a still image, for which all rows are read out in the vertical direction. However, when all rows are read out, only the A-pixel signal may be read out only in specified rows, and only the B-pixel signal may be read out in other specified rows, for phase difference detection. Note that, in this case, image data of a region used for image formation serves as both the A- and B-pixels. Also, in this case, the A-pixel output and the B-pixel output are lack of information relative to an original output for an image, and therefore, some correction process needs to be performed for the pixels during image formation. If such a correction process is performed, the present invention is also applicable when a still image is read out.

Also, in the above embodiments, it is assumed that the first or third scanning method for image formation and the second or fourth scanning method for phase difference detection are invariably performed in combination. However, the present invention is not limited to this. When phase difference detection is not required, only the first or third scanning method may be repeatedly performed. Also, on the other hand, when an image signal is not required and only phase difference detection is required, only the second or fourth scanning method may be repeatedly performed, which can be easily achieved (when AF-dedicated reading is performed).

As to the control of the transfer switch in the vertical scanning circuit in each read mode, any one of reading of the (A+B)-pixel, reading of only the A-pixels, or reading of only the B-pixels can be exclusively selected for each row.

Moreover, in the embodiments described so far, it is assumed that only the A-pixels or only the B-pixels are output in each row. The present invention is not limited to this. Each pixel in the target row may be switched between the A- and B-pixels. This can be determined based on a connection relationship between the transfer signal of the image sensor and the transfer switch of each pixel.

In the embodiments described so far, as described with reference to FIG. 5, the control signal φTXA_n for the n-th row is connected to the transfer transistors 507 of the A-pixels (501) in all pixels of the n-th row, and the control signal φTXB_n for the n-th row is connected to the transfer transistors 508 of the B-pixels (502) in all pixels of the n-th row.

By changing the connection relationship in the same row, each of any pixels may be switched between the A- and B-pixels.

Figure 14:
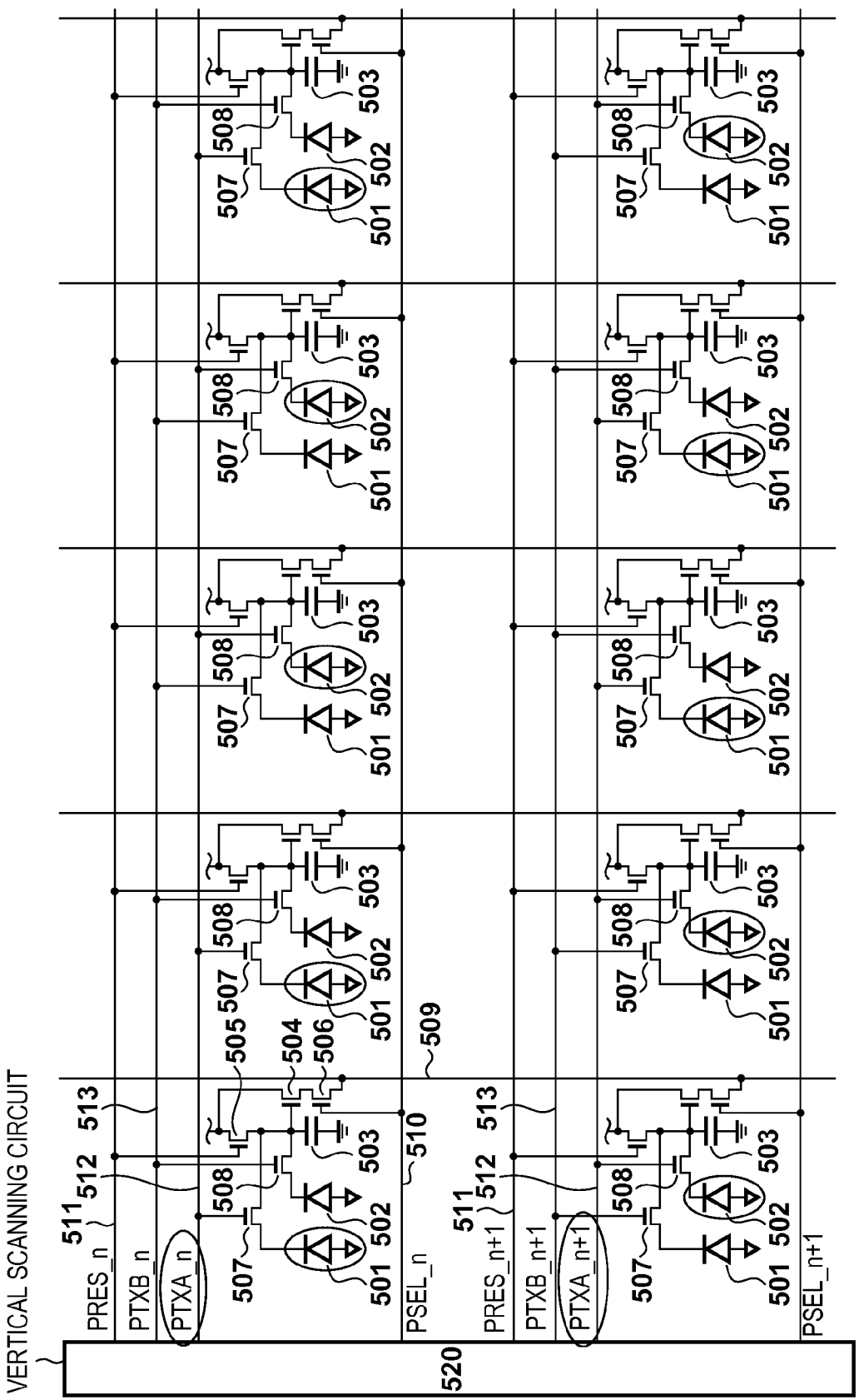
FIG. 14 is a circuit diagram of pixel units of an image sensor which can select an A-pixel or a B-pixel for each of any pixels.

FIG. 14 shows this situation. FIG. 14 schematically shows the n-th row and (n+1)-th row of the image sensor 101. It is assumed that both the n-th row and the (n+1)-th row are in an operation mode in which only φPTXA is effective. In the related art, the A-pixel output may be selected in both the n-th row and the (n+1)-th row. However, as shown in FIG. 14, lines applying φPTXA and φPTXB to the transfer transistors of the pixels are switched between each other for each pixel. As a result, when φPTXA is effective, then if φPTXA is applied to the gate terminals of the transfer transistors for the A-pixels, the A-pixel output is transferred, or then if φPTXA is applied to the gate terminals of the transfer transistors for the B-pixels, the output of the B-pixels is transferred. Of course, when both φPTXA and φPTXB are simultaneously effective, the combination result A+B is obtained as in the related art.

Thus, by switching the lines for each pixel, pixel selection with higher flexibility can be achieved with respect to the required specifications of AF.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-092002, filed on Apr. 25, 2014 which is hereby incorporated by reference herein in its entirety.

What is claimed is:

1. An image capturing apparatus comprising:
an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column; and
a driver that drives the image sensor by using a first drive method of, for rows to be read of the plurality of pixel units, combining a signal of the first photoelectric conversion unit and a signal of the second photoelectric conversion unit for each pixel unit and outputting the combined signal to the storage unit while skipping a plurality of rows between the rows to be read, and a second drive method of reading a signal from the first photoelectric conversion unit of each pixel unit to the storage unit in any of the plurality of rows skipped in the first drive method and reading a signal from the second photoelectric conversion unit of each pixel unit to the storage unit in another of the plurality of rows skipped in the first drive method.

2. The image capturing apparatus according to claim 1, further comprising at least one processor or one circuitry which functions as:
a generator that generates image data based on the signal read out using the first drive method; and
a focus detector that detects a focus state based on the signals read out using the second drive method.

3. The image capturing apparatus according to claim 2, wherein the image capturing apparatus has a still image shooting mode and a moving image shooting mode, and when the still image shooting mode is selected, the generator corrects the signals read out using the second drive method, and generates image data using the corrected signals.

4. The image capturing apparatus according to claim 2, wherein the driver determines the number of the plurality of rows based on at least one of image quality of an image of the image data generated by the generator and accuracy of phase difference detection.

5. The image capturing apparatus according to claim 1, wherein the plurality of rows are two rows, and in the second drive method, a signal is read from the first photoelectric conversion units of one scanned earlier of the two rows to the storage unit, and a signal is read from the second photoelectric conversion units of one scanned later of the two rows to the storage unit.

6. The image capturing apparatus according to claim 1, wherein the plurality of rows are four rows, and in the second drive method, a signal is read from the first photoelectric conversion units of two ones scanned earlier of the four rows to the storage unit, and a signal is read from the second photoelectric conversion units of two ones scanned later of the four rows to the storage unit.

7. The image capturing apparatus according to claim 1, wherein the image capturing apparatus has a still image shooting mode and a moving image shooting mode, and
the driver, when the still image shooting mode is selected, controls the image sensor using a third drive method of combining a signal of the first photoelectric conversion unit and a signal of the second photoelectric conversion unit for each pixel unit and outputting the combined signal to the storage unit without skipping any pixel unit, and when the moving image shooting mode is selected, alternately repeats the first drive method and the second drive method.

8. The image capturing apparatus according to claim 1, wherein in the first drive method, a signal is read from a predetermined first region of the pixel region, and in the second drive method, signals are read from a second region which is smaller than the first region.

9. The image capturing apparatus according to claim 8, further comprising at least one processor or one circuitry which functions as a setting unit that sets a focus detection region,
wherein the second region includes the focus detection region.

10. The image capturing apparatus according to claim 1, wherein the image sensor is covered by a color filter having a Bayer array.

11. A method for controlling an image capturing apparatus including an image sensor including a pixel region including a plurality of pixel units each having a first photoelectric conversion unit and a second photoelectric conversion unit, the plurality of pixel units being arranged in a matrix, and a storage unit configured to store a signal read from the pixel region, one storage unit being provided for each column, the method comprising:
driving the image sensor by using a first drive method of, for rows to be read of the plurality of pixel units, combining a signal of the first photoelectric conversion unit and a signal of the second photoelectric conversion unit for each pixel unit and outputting the combined signal to the storage unit while skipping a plurality of rows between the rows to be read, and a second drive method of reading a signal from the first photoelectric conversion unit of each pixel unit to the storage unit in any of the plurality of rows skipped in the first drive method and reading a signal from the second photoelectric conversion unit of each pixel unit to the storage unit in another of the plurality of rows skipped in the first drive method.

* * * * *